(12) United States Patent
DeCourcy et al.

(10) Patent No.: US 8,002,047 B2
(45) Date of Patent: Aug. 23, 2011

(54) METHOD AND APPARATUS FOR DEFLAGRATION PRESSURE ATTENUATION

(75) Inventors: Michael S. DeCourcy, Houston, TX (US); James E. Elder, Houston, TX (US); Timothy Allen Hale, Houston, TX (US); Nam Quoc Le, Friendswood, TX (US); Patrick Kevin Pugh, Kingwood, TX (US); John Somson, Moorestown, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 187 days.

(21) Appl. No.: 12/383,909

(22) Filed: Mar. 30, 2009

(65) Prior Publication Data
US 2009/0277655 A1 Nov. 12, 2009

Related U.S. Application Data

(60) Provisional application No. 61/072,502, filed on Mar. 31, 2008.

(51) Int. Cl.
*A62C 2/00* (2006.01)
(52) U.S. Cl. ............................................. 169/46; 169/43
(58) Field of Classification Search .................... 169/43, 169/46, 66
See application file for complete search history.

(56) References Cited

U.S. PATENT DOCUMENTS

| | | | |
|---|---|---|---|
| 3,356,256 A | 12/1967 | Szego | |
| 4,613,054 A | 9/1986 | Schrenk | |
| 5,495,511 A | 2/1996 | Chakraborty | |
| 5,495,893 A | 3/1996 | Roberts et al. | |
| 5,617,208 A | 4/1997 | Alumbaugh et al. | |
| 5,718,293 A | 2/1998 | Flynn et al. | |
| 5,750,278 A * | 5/1998 | Gillett et al. | 429/436 |
| RE36,912 E | 10/2000 | Donovan | |
| 6,540,029 B2 | 4/2003 | Snoeys et al. | |

(Continued)

OTHER PUBLICATIONS

Fauske, Hans K., Expanded-Metal Networks: A Safety Net to Thwart Gas Explosions, Chemical Engineering Progress, Dec. 2001, pp. 66-71.

(Continued)

*Primary Examiner* — Davis Hwu
(74) *Attorney, Agent, or Firm* — Marcella M. Bodner

(57) ABSTRACT

A method for attenuating deflagration pressure produced by combustion of combustible gas in a defined region of a process vessel. The method generally comprises selecting and placing attenuating material in the defined region of the process vessel, wherein the selected attenuating material maintains its physical shape under the operating conditions. The attenuating material should occupy at least 20% of the volume of the defined region of the process vessel. Use of the inventive method may be beneficially applied for the safe operation of oxidation reactors with flammable, high hydrocarbon concentration feeds in order to attain increased productivity. The invention also provides a tubular reactor adapted for attenuation of deflagration pressure resulting from combustion of combustible gas in a defined region therein, wherein the defined region of the tubular reactor comprises attenuating material selected in accordance with the aforesaid method for attenuating deflagration pressure and which have a plurality of components which are placed such that void spaces and open pathways between the components are minimized. A method for performing gas phase reactions safely under flammable operating conditions is also provided, wherein a gas feed composition comprising a hydrocarbon and oxygen is subjected reaction in a reaction vessel having attenuating materials therein and the reaction is conducted at a temperature and a pressure which render the reaction system flammable. By using the inventive apparatus, full pressure containment may be achieved, thereby eliminating the need for emergency pressure relief devices.

17 Claims, 23 Drawing Sheets

U.S. PATENT DOCUMENTS

| | | |
|---|---|---|
| 6,932,950 B1 | 8/2005 | Guetlhuber |
| 7,000,630 B2 | 2/2006 | Knyrim et al. |
| 2001/0022302 A1* | 9/2001 | Dunn et al. .............. 220/62.11 |
| 2006/0292046 A1 | 12/2006 | Fruchey et al. |

OTHER PUBLICATIONS

Razus D., et al., Closed vessel combustion of propylene-air mixtures in the presence of exhaust gas, Fuel (2007), doi:10.1016/j.fuel.2006.12.009.

W. Bartknecht, Springer-Verlag, "Explosions" New York, 1981 (in particular, see Chapter 2, Explosions in Closed Vessels.

W. L. McCabe and J.C. Smith, Table 23-1 (p. 710) of Unit Operations of Chemical Engineering, 3rd Ed., 1976, McGraw-Hill, New York.

Smyth, K., et al., Short-Duration Autoignition Temperature Measurements for Hydrocarbon Fuels Near Heated metal Surfaces, Combust, Sci and Tech. 1997 vol. 126, pp. 225-253.

* cited by examiner

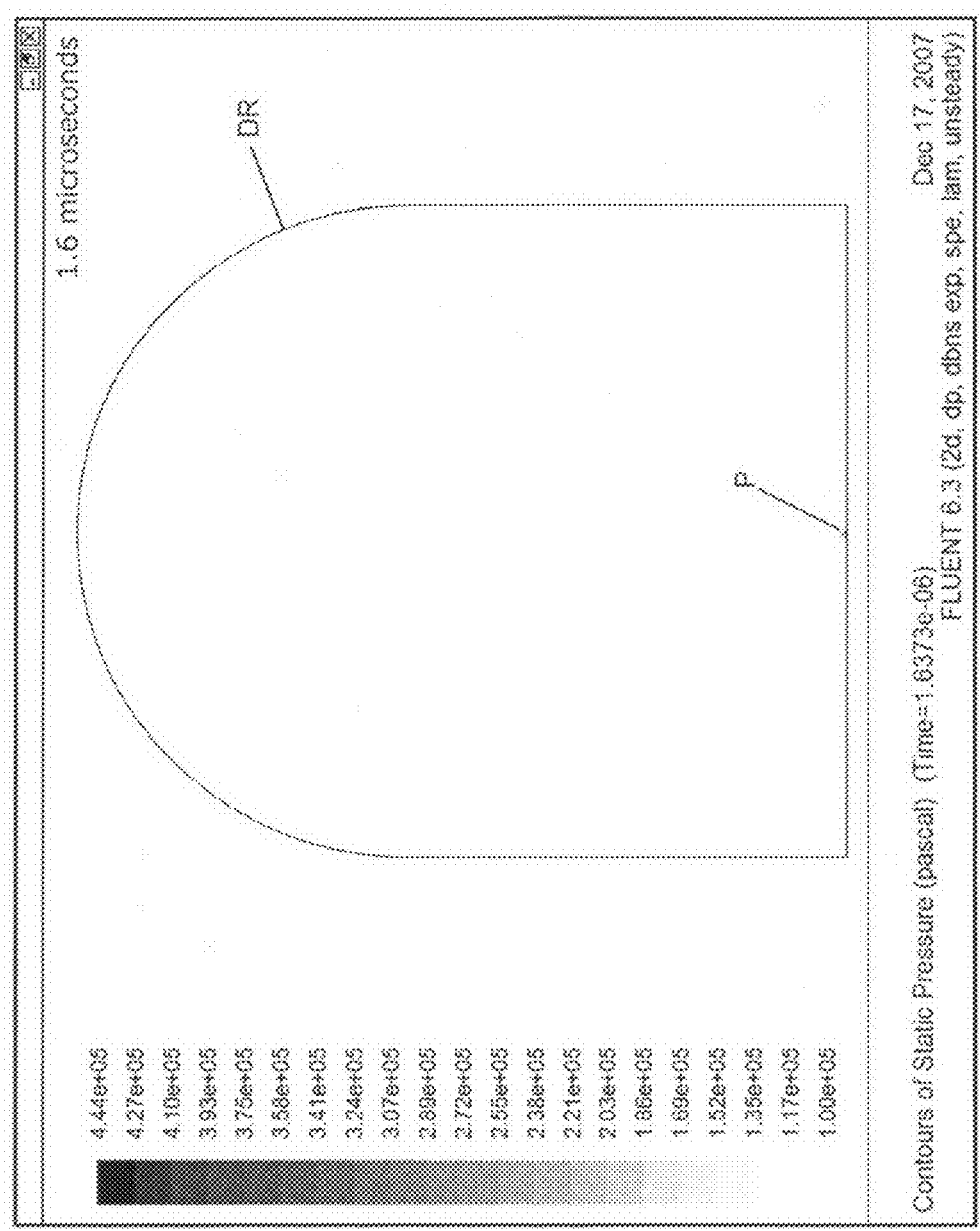

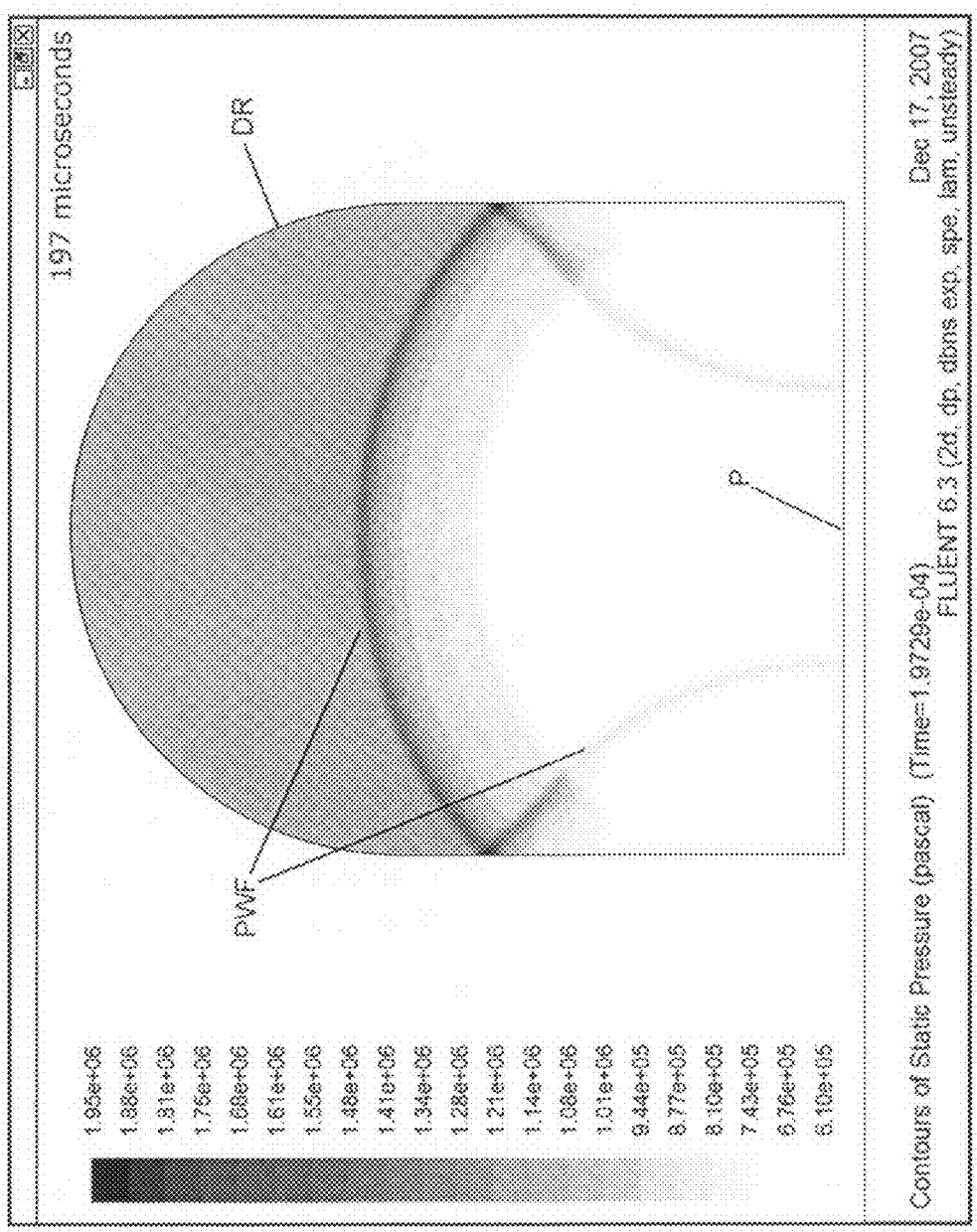

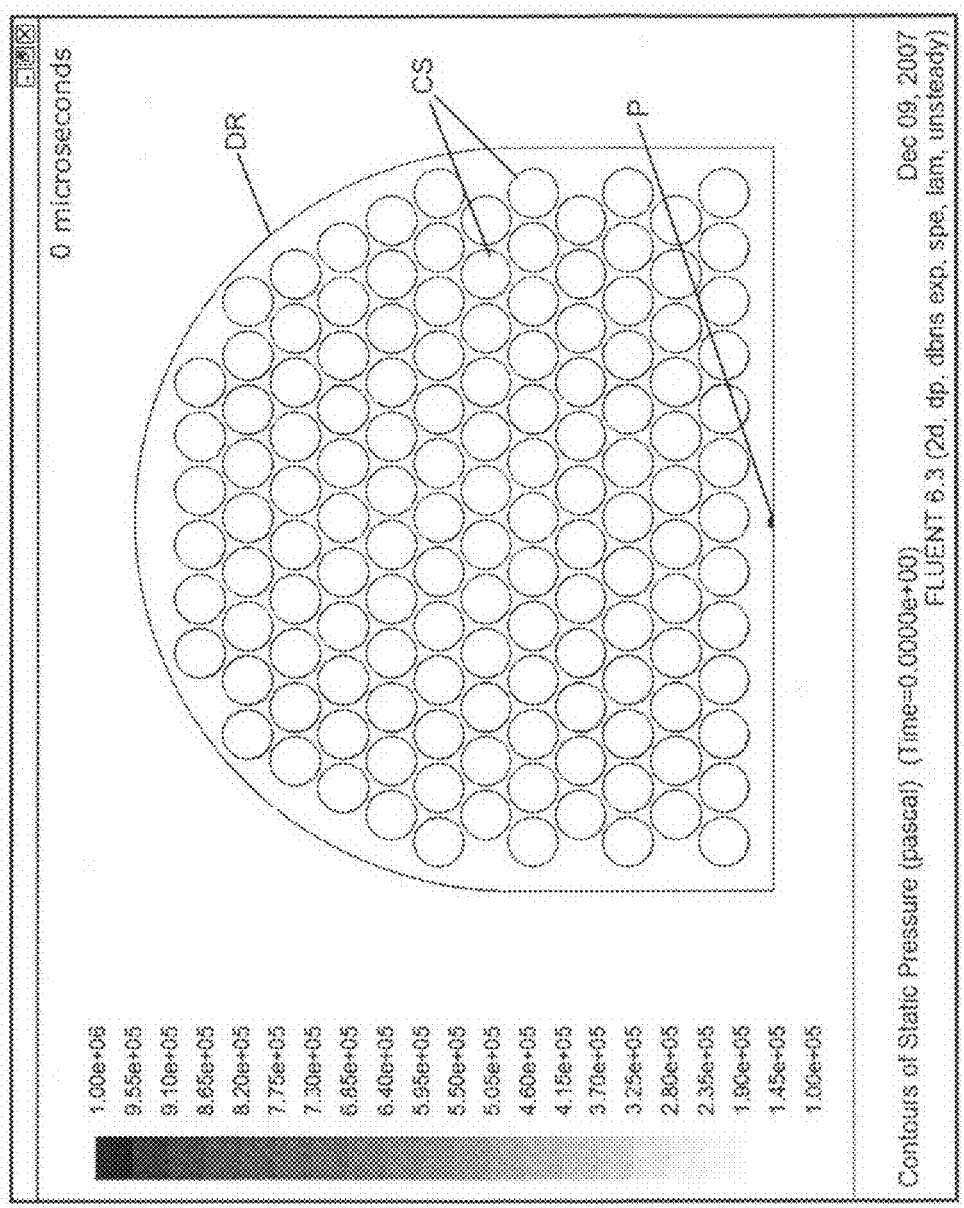

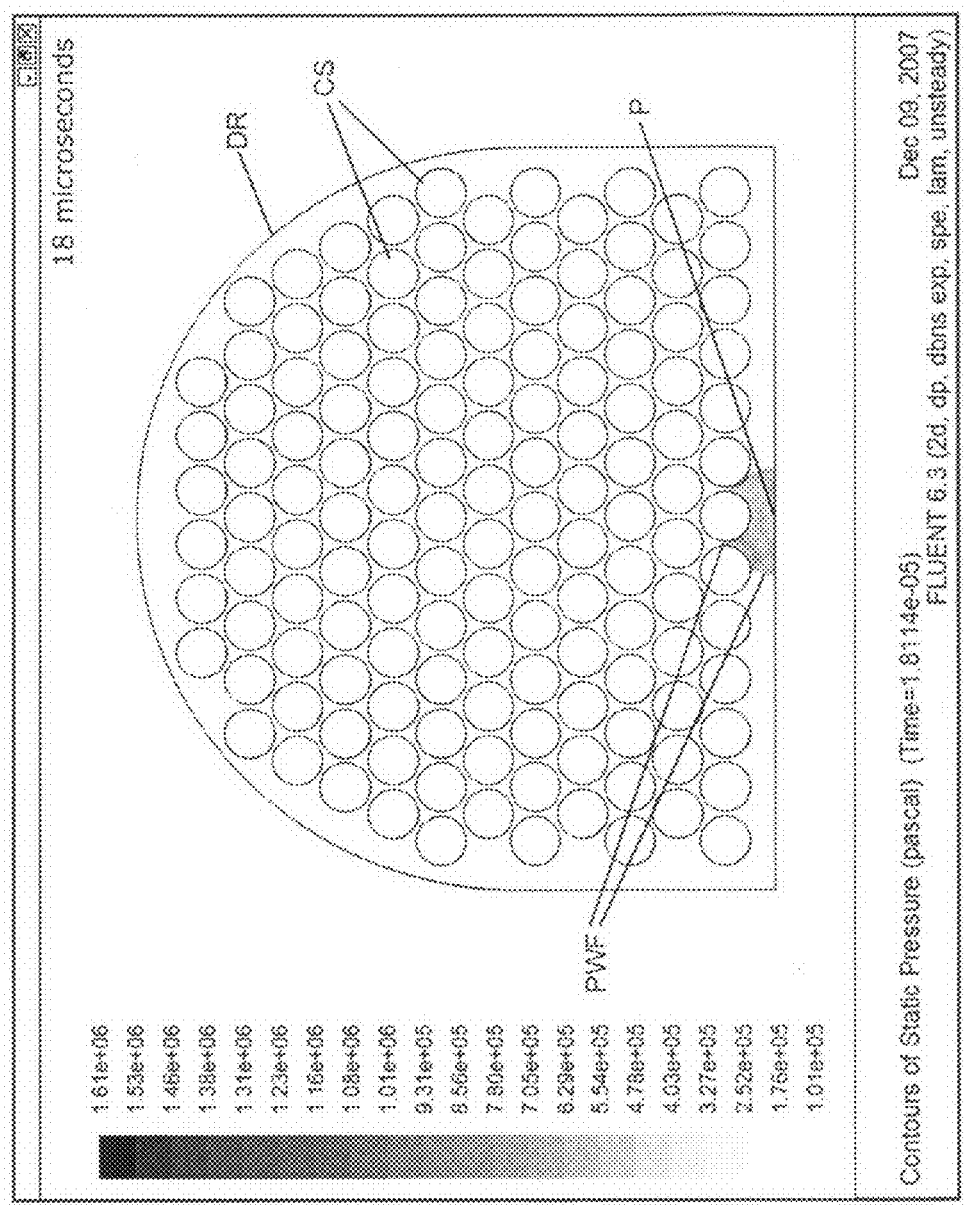

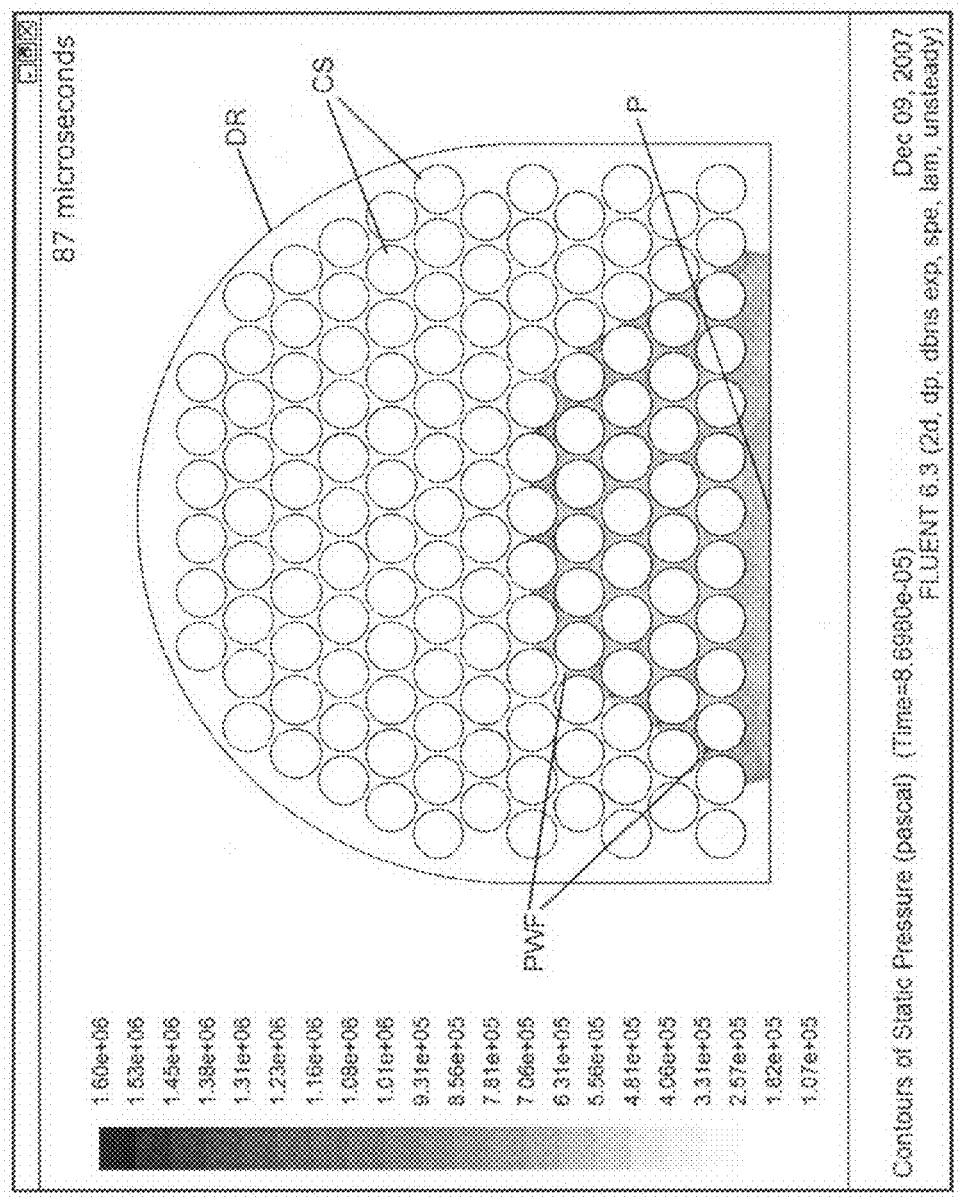

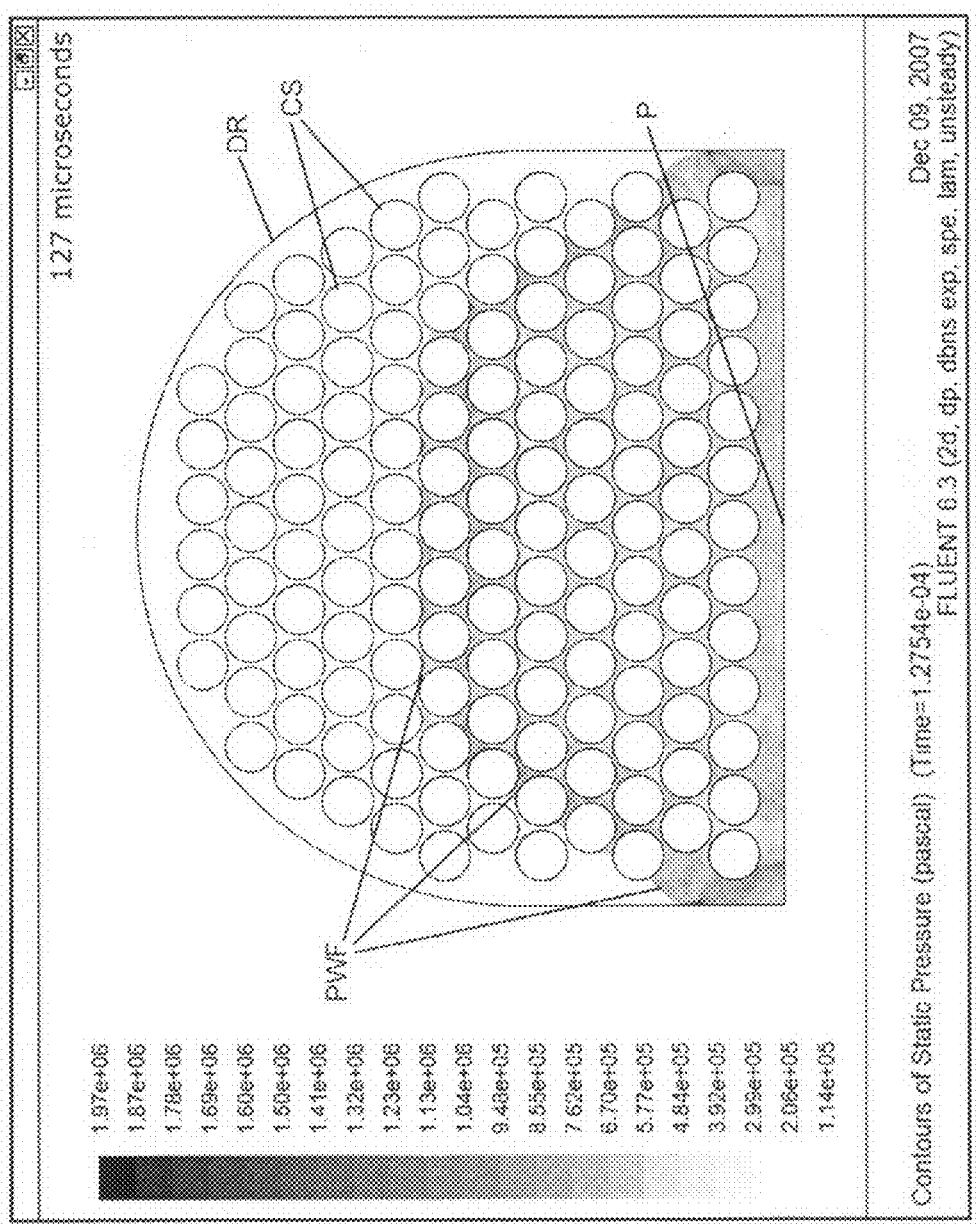

cross-sectional layers R-R, S-S, T-T, U-U an V-V cross-sectional layer X-X cross section Y-Y cross-section Z-Z Deflagration Pressure vs. Time Lapsed DMF vs. Pmax

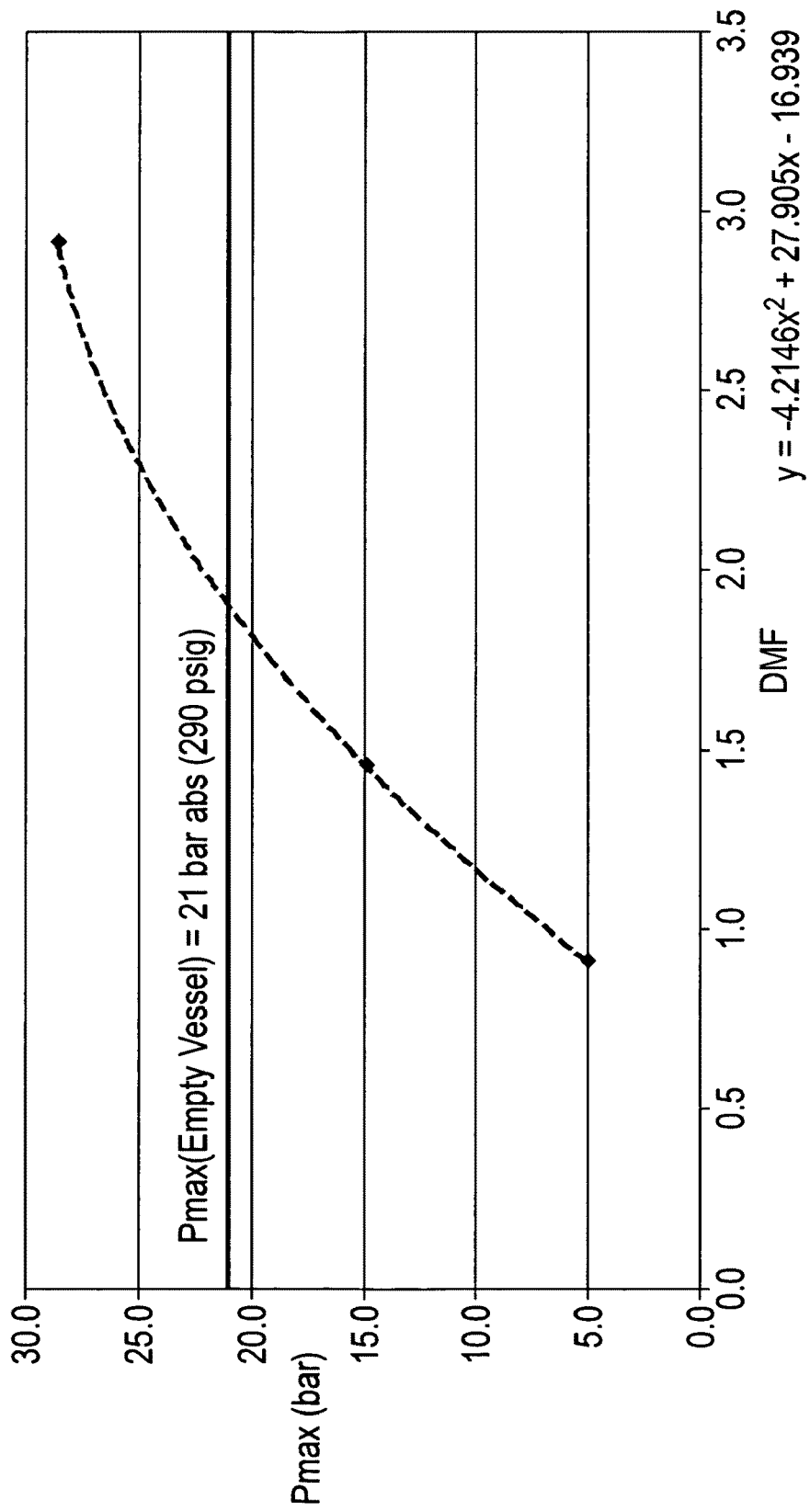

METHOD AND APPARATUS FOR DEFLAGRATION PRESSURE ATTENUATION

This application claims the benefit of priority under 35 U.S.C. §119(e) of U.S. Provisional Patent Application No. 61/072,502 filed on Mar. 31, 2008.

FIELD OF THE INVENTION

The present invention relates to a method and apparatus for controlling, containing and suppressing explosion of combustible gas in a process vessel.

BACKGROUND OF THE INVENTION

The handling of combustible materials, while necessary in many industrial processes and facilities, often presents a danger because of the potential for combustible materials to combust, detonate, or explode in process equipment, thereby damaging the equipment and injuring personnel. Combustible materials are often present in the form of liquids, gases, or both, in the reactors, conduits, storage vessels, separations apparatus, etc. of various manufacturing processes, such as those which produce (meth)acrylates, (meth)acrcylate esters, nitrites, and various other materials.

When combustible gas is present in sufficient concentrations, by volume, with oxygen, exposure to an ignition source, such as a spark, a chemical reaction, a hot wire or other hot surface, or even a hot spot (i.e., a localized region of increased temperature in a body of fluid) may initiate localized deflagration in the combustible gas. Combustible gases generally deflagrate at concentrations above the lower explosive limit and below the upper explosive limit of the combustible gas. Combustible gas may, of course, be comprised of a single kind of gas, but is often a mixture of one or more different gases, the particular composition of which renders the mixture combustible. Where a combustible gas is present, there is always some risk of deflagration because inadvertent ignitions cannot be 100% prevented.

The deflagration may or may not progress, ultimately, to one or more further damaging events such as detonation or explosion. Of course, such events have the potential to cause severe damage to equipment, as well as serious injury, or even death, to personnel who operate and monitor the equipment. Thus, the control, containment and suppression of ignition, combustion, deflagration and detonation or explosion of combustible materials are of critical importance to the safe and ongoing operation of many industrial manufacturing and processing operations. While some apparatus and technologies address avoidance of ignition, others attempt to contain, suppress, and extinguish a combustion event which would otherwise develop following inadvertent ignition. See, e.g., Grossel, Stanley S., Ed., *Deflagration and Detonation Flame Arresters*, AIChE (Center for Chemical Process Safety), New York, N.Y. (2002), Chapter 5, pp. 77-138.

For instance, U.S. Pat. No. 3,356,256 discloses the use of heat-dissipating metal netting within fuel storage containers as a means to absorb heat within the container that might otherwise lead to ignition. U.S. Pat. No. 4,613,054 discloses the use of aluminum foil balls with high thermal conductivity to accomplish the same result. Both approaches seek to employ a heat-sink to prevent sustained combustion from being achieved.

Similarly, Fauske (See, Fauske, Hans K., *Expanded-Metal Networks: A Safety Net to Thwart Gas Explosions*, Chemical Engineering Progress, December 2001, pp. 66-71) proposes the use of expanded metal foils as heat sinks within storage tanks to prevent flame-front propagation by removing combustion zone heat-energy. Fauske mimics the design of deflagration arrestors by employing high surface area (400 m$^2$/m$^3$ and higher) metal foils with tight passages for flame quenching. In relatively static storage tanks, such tight passages are of little consequence. However, in process vessels, such as reactors, the flow of process fluids through tight passages raises pressure drop across the vessel and consequently increases motive-force energy consumption. Additionally, in order for metal foil networks to effectively quench combustion (and thereby avoid subsequent progression to detonation or explosion), a large enough temperature differential (?T) must be maintained such that heat energy from the combustion zone can be quickly transferred into the metal foil. Unfortunately, many process vessels used to handle, react or store combustible gases are operated under conditions of elevated temperatures and/or pressures. As is well known in the art of hydrocarbon processing, increased heat and pressure both widens flammability limits (greater range of composition supports combustion) and reduces the incremental energy required to maintain self-sustaining combustion. Thus in many combustible gas process vessels, such as oxidation reactors, the use of heat-dissipating components, such as expanded metal foils, is largely ineffective at quenching combustion. Propagation of the deflagration pressure wave and flame front in such high temperature and pressure process vessels are simply too fast for heat absorption to occur at a rate that is sufficient to quench the combustion.

U.S. Pat. No. 5,495,893 discloses an apparatus and method to control deflagration of gases, wherein the apparatus includes a combustible substance detector which triggers delivery of a deflagration suppressant into the combustible substance, by a liquid atomizing device for controlling the size of the liquid suppressant droplets. The disclosure of this patent states that deflagration can be effectively suppressed by heat absorption, such as by utilizing a fine mist liquid stream (i.e., the deflagration suppressant) that can be rapidly vaporized to quickly remove the heat by which a deflagration propagates. This solution is based on the understanding that, in a deflagration, the combustion of a combustible gas initiates a chemical reaction that propagates outward by transferring heat and/or free radicals to adjacent molecules of the combustible gas. The transfer of heat and/or free radicals ignites the adjacent molecules and, in this manner, the deflagration propagates or expands outward through the combustible gas.

U.S. Pat. No. 6,540,029 discloses a deflagration suppression and explosion isolation system which has the goal of suppressing the deflagration stage of an explosion and preventing deflagration phenomena originating in a containment structure from propagating into an associated conduit and then transitioning into detonation phenomena in the conduit. The system described in this patent includes a pressure detector for detecting a rapid rise of pressure, which is indicative of an incipient explosion, and a suppressant device which directs a fire suppression agent into the combustible gases, as well as a gate valve assembly which closes in tandem with release of the suppressant agent to redirect the flame and combustion generated pressures. Again, the device in U.S. Pat. No. 6,540,029 operates to introduce an additional material, a suppressant agent, into the combustible gas for absorption of heat which otherwise facilitates propagation of the deflagration and its transition to detonation. This patent acknowledges that, during a deflagration event, a pressure wave and a flame front are generated at the point of ignition and propagate outward in all directions therefrom, with the pressure wave traveling faster than the flame front. Furthermore, obstacles and bends in a pipe or conduit containing the combustible gas will increase turbulence (i.e., mixing) which, in turn, accelerates the transition from deflagration to detonation. As is well understood in the art, increases in turbulence and mixing of combustible gas are to be avoided when implementing deflagration control measures.

In Razus D., et al., *Closed vessel combustion of propylene-air mixtures in the presence of exhaust gas*, Fuel (2007), doi:10.1016/j.fuel.2006.12.009, it is recognized that characteristic parameters of explosion propagation in closed vessels include the peak pressure reached after deflagration, the time required to reach that peak pressure and the decrease of peak pressure achieved by introduction of diluent material into a combustible gas after ignition. This research article concludes that, exhaust gas, which typically contains carbon dioxide and water vapor, has an important inerting effect on flammable fuel-air mixtures and may be considered a cheap diluent for mitigation of fuel-air explosions. While this technology addresses controlling or minimizing an explosion after ignition of combustible gas, it does so by adding an inert material, which is similar to the method of introducing flame suppressants to a combustible gas after ignition to absorb heat and slow propagation of the flame front during deflagration.

The technology described in U.S. Pat. No. 6,932,950 is an attempt to minimize or eliminate secondary reactions, including but not limited to ignition and deflagration, which have greater risk of occurring at the inlet side of a tubular reactor where the feed gas mixture is a combustible gas coming in contact with the hot spots proximate to the inlet tube-sheet of the reactor. This patent discusses the previously known practices of placing a layer of ceramic materials, or wire mesh, in the inlet chamber, adjacent to the inlet tube sheet on the inlet gas side, but not filling more than about 20% of the chamber's volume, to create a barrier between the incoming feed gas and the hot tube-sheet. Other methods described include creating a cooling chamber proximate to the hot tube-sheet (chamber is filled with circulating air), as well as forming a solid barrier (e.g., using poured resin material to form a layer adjacent to the tube-sheet, on the heat carrier side to insulate the tube-sheet from the heat carrier). The solution described in U.S. Pat. No. 6,932,950 is the provision of a separate insulation chamber within the inlet chamber of the reactor that is proximate to and on the inlet side of the tube-sheet. The insulation chamber is sized and shaped to be commensurate with the cross-section of the tube-sheet, and is either evacuated or filled with air, sand, oil, or any other suitable solid, liquid, or gaseous material incapable of reacting with the heat carrier. All of these technologies are aimed at prevention of ignition and other undesirable side reactions by placement of a barrier of material between the hot tube-sheet and incoming gaseous feed streams. None of these technologies involve filling the gas inlet or outlet regions of the reactor with suitably shaped and sized attenuating material which deflects the pressure wave of a deflagration, after inadvertent ignition to quench and contain the deflagration and prevent it from progressing to detonation.

A device for physically diverting the flame front of a deflagration event is described in U.S. Pat. No. 7,000,630, wherein a flame front diverter directs the high-speed pressure wave towards a bi-directional rupturable disc causing the rupturable disc to open thus creating an aspiration effect on the opposite bi-directional rupturable disc, which creates an escape path for the pressure wave and flame front, as well as drawing in fresh air as a diluent. The flame front diverter described in this patent is designed to prevent a deflagration from propagating from one vessel to another.

There remains a need for an effective, simple and economical method for controlling, containing and suppressing explosion of combustible gas in a process vessel. Applicant have developed a method and apparatus which addresses this need by attenuating, and thereby diminishing, the pressure wave created during a deflagration to prevent the deflagration from transitioning to detonation, rather than attempting to suppress and quench the flame front by removing heat from a combustible gas which has been ignited by providing solid materials known to absorb heat into the process vessel, or by introducing flame retardant or suppressants materials after ignition has occurred.

SUMMARY OF THE INVENTION

The present invention provides a method for attenuating deflagration pressure produced by combustion of combustible gas in a defined region of a process vessel under known operating conditions comprising initial feed gas composition, temperature and pressure, wherein a peak pressure is reached in the defined region after ignition. The method generally comprises selecting and placing attenuating material in the defined region of the process vessel, wherein the selected attenuating material maintains its physical shape under the operating conditions and has a plurality of components, all of which have a geometry and an effective diameter. The attenuating material should occupy at least 20% of the defined region of the process vessel.

The first step of the inventive method is determining the maximum effective diameter of components of the attenuating material which is suitable for use in the defined region of the process vessel by developing empirical data comprising associated pairs of peak deflagration pressures and deflagration mixing factors, which demonstrates a linear relationship between a plurality of attenuating materials, at least one of which has components with an effective diameter which differs from the effective diameters of the components of the other attenuating materials, and the peak pressures reached after ignition of combustible gas having the same composition as the initial feed gas composition. This is accomplished by: (1) empirically determining the peak deflagration pressure ($Pmax(0)$) resulting from ignition of the combustible gas in the absence of any attenuating material, using a test sphere having a radius ($R(ts)$); (2) empirically determining at least a first and a second peak deflagration pressure ($Pmax(1)$, $Pmax(2)$) resulting from ignition of the combustible gas in the presence of at least a first selected attenuating material having a first effective diameter ($Ds(1)$) and a second selected attenuating material having a second effective diameter ($Ds(2)$) different from the first effective diameter, using the same test sphere used in step (1); (3) calculating the deflagration mixing factors ($DMF(0), DMF(1), DMF(2), \ldots DMF(n)$) for each associated peak deflagration pressure empirically determined in steps (1) and (2), by using the following mathematical relationship: $DMF(n)=(Ds(n)/Rts) \times 40$, wherein $n=0, 1, 2 \ldots n$, and $Ds(n)$ and $R(ts)$ are each measured in centimeters. These steps are followed by linearizing the empirical data comprising associated pairs of peak deflagration pressures and deflagration mixing factors ([$Pmax(0), DMF(0)$]; [$Pmax(1) DMF(1)$], [$Pmax(2), DMF(2)$], ... [$Pmax(n), DMF(n)$]) by determining the value of variables M and B based on the following mathematical relationship: $Pmax(n)=M \times DMF(n)+B$, wherein $n=0, 1, 2 \ldots n$.

After linearization is accomplished, the maximum deflagration mixing factor ($DMF(a)$) is calculated for the process vessel using the maximum allowable containment pressure ($P(c)$) of the process vessel and the values of M and B calculated in step (4), based on the following mathematical relationship: $DMF(a)=[P(c)-B]/M$; and then the maximum effective diameter ($Ds(a)$) of attenuating material suitable for use with the process vessel having the cross-sectional radius ($R(v)$), is calculated using the following mathematical relationship: $Ds(a)=[DMF(a)\times R(v)]/40$.

Having calculated the maximum effective diameter ($Ds(a)$) for the components of attenuating material, a suitable attenuating material is selected. A suitable attenuating material will have an effective diameter Ds less than or equal to the calculated maximum effective diameter ($Ds(a)$) for the particular process vessel and placing the selected attenuating material in the defined region of the process vessel. The attenuating materials may be simply poured into, or manually arranged in, the defined region of the process vessel, depending on whether the components of the attenuating material are self-ordering, such that void spaces and open pathways between the components are minimized.

In one embodiment of the method of the present invention, the step of empirically determining the peak deflagration pressure ($Pmax(0)$) may comprise: (a) igniting the combustible gas in the test sphere, which is otherwise empty, under the pressure and temperature of the predetermined operating conditions; and then (b) measuring the highest pressure ($Pmax(0)$) reached in the test sphere, after ignition. Furthermore, the step of empirically determining at least a first and a second peak deflagration pressure ($Pmax(1)$, $Pmax(2)$) comprises: (a) igniting combustible gas in the test sphere, after filling it with the first selected attenuating material, under the pressure and temperature of the predetermined operating conditions; (b) measuring the highest pressure ($Pmax(1)$) reached in the test sphere filled with the first selected attenuating material, after ignition; (c) igniting combustible gas in the test sphere, after filling it with the second selected attenuating material, under the pressure and temperature of the predetermined operating conditions; and (d) measuring the highest pressure ($Pmax(2)$) reached in the test sphere filled with the second selected attenuating material, after ignition. It is also possible to empirically determine a plurality of peak deflagration pressures ($Pmax(1)$, $Pmax(2)$, $Pmax(3)$, ... $Pmax(n)$) and then use each peak deflagration pressure in the subsequent calculating and linearizing steps.

In another embodiment, the combustible gas comprises hydrocarbons and oxygen and the process vessel may be a shell and tube reactor which is operating under flowing conditions.

The present invention also provides a tubular reactor adapted for attenuation of deflagration pressure resulting from combustion of combustible gas therein. The inventive tubular reactor comprises attenuating material having a plurality of components, all of which have a geometry and which are placed such that void spaces and open pathways between the components are minimized, wherein the attenuating material occupies at least 20% of at least one of the defined inlet region and the defined outlet regions of the process vessel. Moreover, the components of the attenuating material have an effective diameter ($Ds(a)$) which satisfies the following mathematical relationship: $Ds(a)=[DMF(a)\times R(v)]/40$, wherein $Ds(a)$ is in centimeters. Additionally, ($DMF(a)$) is the deflagration mixing factor associated with the attenuating material and which is determined empirically by the method of the present invention described above. Finally, $R(v)$ is the radius of whichever defined inlet or outlet region is occupied by the attenuating material.

The present invention further provides a method for performing gas phase reactions safely under flammable operating conditions, which comprise a gas feed composition, temperature and pressure. This method involves: (A) providing a reaction vessel having a defined region through which said gas feed composition passes, said defined region being at least 20% by volume occupied by at least one attenuating material which maintains its physical shape under the flammable operating conditions; (B) providing one or more gaseous materials comprising a hydrocarbon, an oxygen-containing gas and, optionally, an inert material, to said reaction vessel to form said gaseous feed composition which passes through said defined region; and (C) subjecting said gaseous feed composition to one or more reactions in the reaction vessel, at a temperature and pressure under which said gaseous feed composition is flammable.

The attenuating material may be selected according to the method for attenuating deflagration pressure produced by combustion of combustible gas described above. In one embodiment of the method for performing gas phase reactions safely under flammable operating conditions, the hydrocarbon comprises propylene which is subjected to oxidation in a reaction vessel having attenuating materials comprising crimped wire mesh cylinders and crimped wire mesh polyhedrons. In another embodiment of the method for performing gas phase reactions safely under flammable operating conditions, the gaseous materials further comprise ammonia, the hydrocarbon comprises methane, and the gas phase reactions comprise ammoxidation of the methane, wherein the attenuating materials comprise ceramic foam polyhedrons.

BRIEF DESCRIPTION OF THE DRAWINGS

A more complete understanding of the present invention will be gained from the embodiments discussed hereinafter and with reference to the accompanying drawings, in which like reference numbers indicate like features, and wherein:

FIGS. 4A-4C are a series of computer model-generated graphical images showing the progression of a deflagration pressure wave front from the point of ignition in a defined region which contains no attenuating materials;

FIGS. 5A-5J are a series of computer model-generated graphical images showing the progression of a deflagration pressure wave front from the point of ignition in a defined region which contains attenuating material comprising ceramic spheres;

FIG. 11 is a plot of empirical data, i.e., deflagration mixing factor (DMF) vs. maximum deflagration pressure (Pmax), derived from experiments conducted with attenuating material comprising Pall rings and calculations in accordance with the present invention.

DETAILED DESCRIPTION OF THE INVENTION

Figure 1:
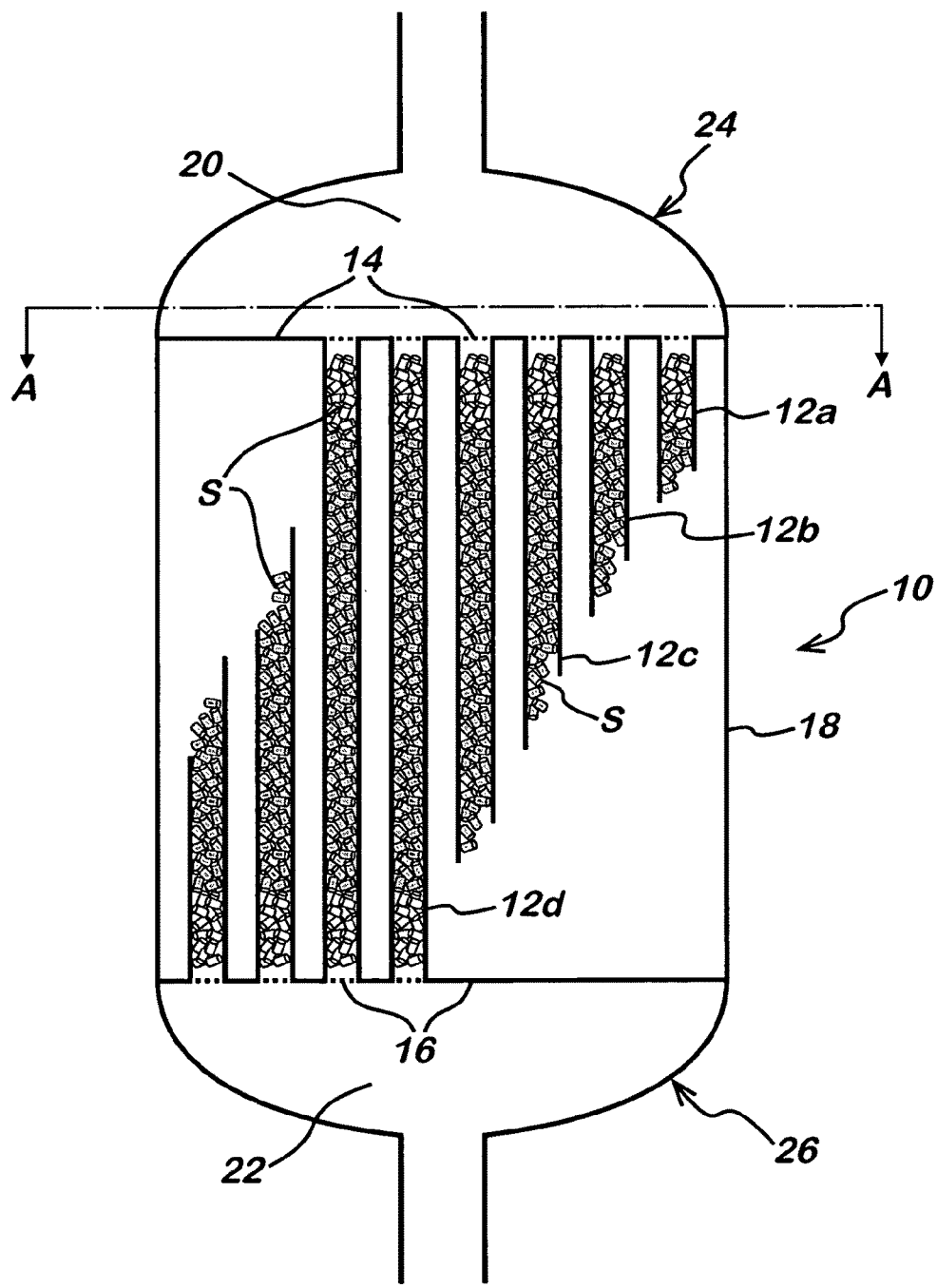
FIG. 1 is a schematic, partially cross-sectional elevational side view of a process vessel, i.e., a tubular reactor for catalytic gas phase reactions.

The method of the present invention is suitable for attenuating deflagration pressure produced by combustion of combustible gas in a defined region of a process vessel. The method involves selecting and placing attenuating material in the defined region to deflect and fragment the pressure wave associated with the deflagration.

A "process vessel" means any apparatus that is used in connection with the storage, transport, reaction, manufacture, handling, or other manipulation of combustible substances.

A "defined region," as this term is used herein, is the designated area in a process vessel to be protected from the effects of a deflagration. The defined region is typically an enclosed area containing a combustible gas or an area in the process vessel within which the risk of a deflagration is greatest. The location, geometry and volume of the defined region will vary depending upon the application and process vessel.

As used herein, the term "volume-fill" refers to the apparent volume occupied by attenuating material in a defined region and is equal to the combined volume actually occupied by the attenuating material components and the interstitial void spaces between those components.

"Combustible gases" are gases which are present in sufficient compositions and concentrations, by volume, with oxygen, and whose exposure to an ignition source, such as a spark, a chemical reaction, a hot wire or other hot surface, or even a hot spot (i.e., a localized region of increased temperature in a body of fluid) may initiate localized deflagration in the combustible gas. Combustible gas may, of course, be comprised of a single species of gas, such as hydrogen, butane, propylene, etc., but is often a mixture of one or more different gases, the particular composition of which renders the mixture combustible.

Without wishing to be bound by theory, it is believed that the progression of conditions in a combustible gas, from ignition to detonation and explosion, is generally understood to proceed as follows. Immediately upon ignition, a spherical flame front and a spherical pressure wave are formed by the local combustion of the combustible gas at the ignition source. Both the pressure wave and flame front tend to propagate radially, in all directions, outward and away from the ignition point, into the unaffected portions of the combustible gas. It has been long understood that propagation of the flame front involves heat transfer and proceeds much slower than propagation of the pressure wave, which travels at the speed of sound. This stage of an incipient explosion is generally referred to as a deflagration, i.e., when the pressure wave and flame front are traveling separately, with the pressure wave in advance.

During a deflagration, the flame front propagates outward by transferring heat and/or free radicals to adjacent molecules of the combustible gas, which ignites the adjacent molecules. A free radical is any reactive group of atoms containing unpaired electrons, such as OH, H, and $CH_3$.

Also during a deflagration, the energy of the pressure wave may compress uncombusted portions of the combustible gas ahead of the pressure wave, reducing the thermal energy demand needed to sustain combustion in those portions of combustible gas, thereby facilitating further combustion, accelerating the progression of the flame front, and reinforcing the advancing pressure wave. This strengthening of the pressure wave continues up to the point where the pressure wave alone is strong enough to initiate the combustion reaction, thereby initiating the detonation stage. Initially, the detonation wave will propagate into the compressed combustible gas and catch up to the foremost pressure wave, becoming a stable detonation with a constant velocity. A stable detonation wave consists of a pressure wave closely coupled with a flame front such that the energy released by the flame front supports the pressure wave.

When deflagration occurs in a pipe or conduit, in which materials tend to travel axially, and the flame front reaches the wall of the pipe or conduit, it changes from spherical form to an essentially planar front. As the planar flame front continues to propagate down the length of the pipe, it begins to elongate and the surface of the flame increases. As the surface area increases, the burning rate increases and as a result, the flame propagation velocity increases. In other words, the propagating flame front may rapidly transition from an initial deflagration state to a detonation state within a conduit.

The size of the molecules of the combustible material affects the overall explosion phenomena, as does the diameter of the conduit or vessel through which the products of combustion are flowing. For example, pipes of larger diameter provide smaller heat sinks than smaller diameter pipes or conduits. The longitudinal configuration of piping or conduits also affects the propagation of the flame front and pressure wave. It is known in the art that obstacles and bends in the pipe or conduit can increase turbulence which in turn will tend to increase flame surface area, which leads to enlargement of the flame front and causes faster transition to detonation.

Figure 8:
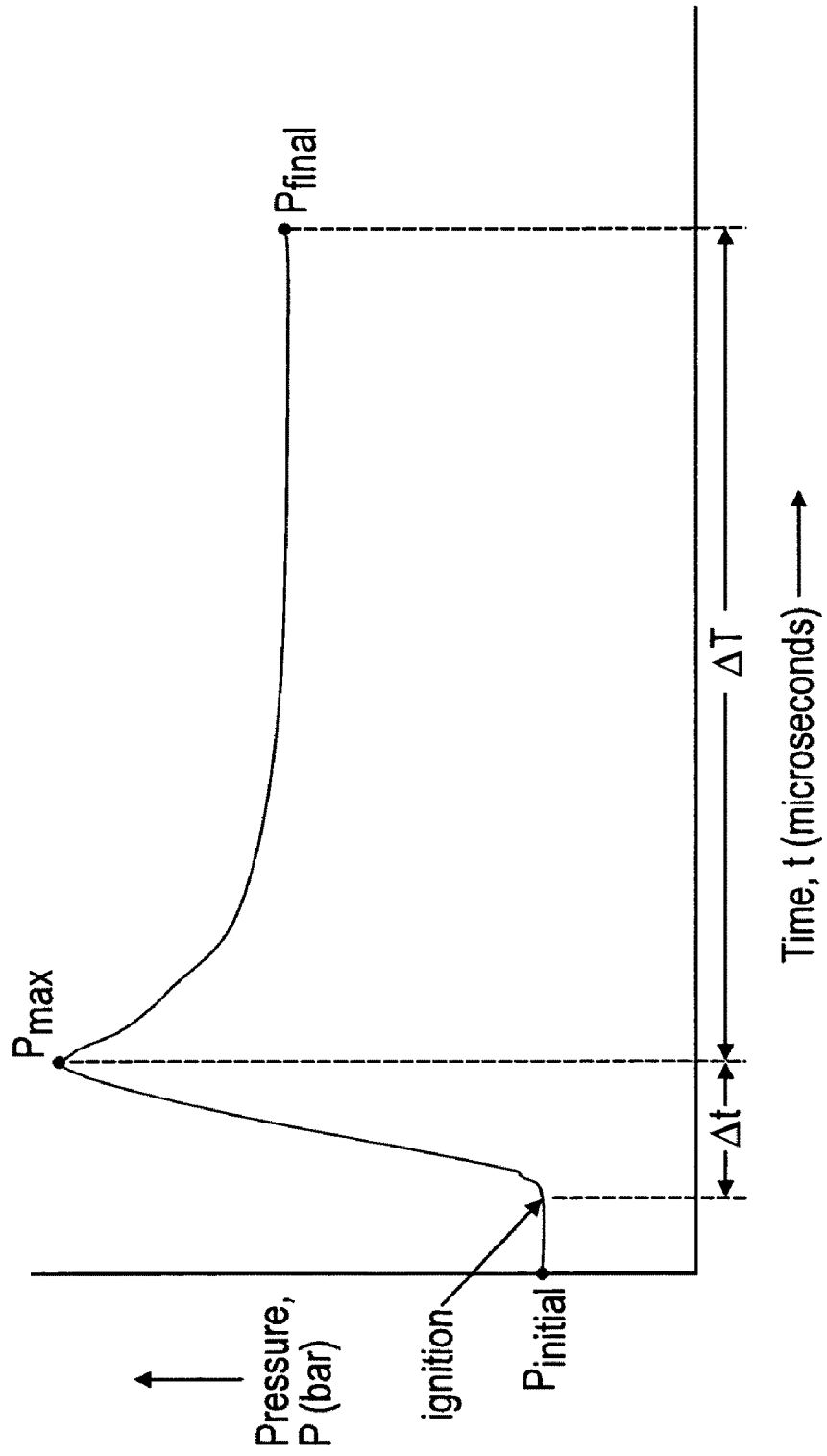
FIG. 8 is a generalized representation of the changes in the deflagration pressure over time, starting at the time of ignition and ending with the homogenized pressure which follows Pmax.
Figure 9:
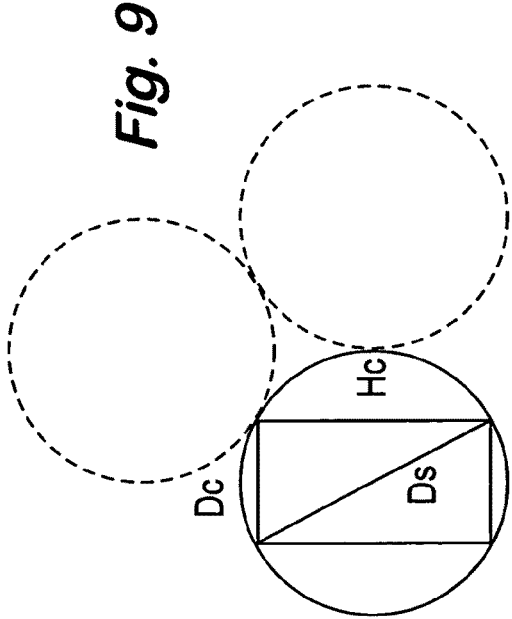
FIG. 9 is a diagram showing how the effective diameter of cylindrical attenuation material components is approximated based on the diameter of a circumscribed circle.

With reference briefly now to FIG. 8, a simplified explosion diagram which is typical for combustible gas mixtures is shown. Of course, in practice, each such explosion diagram would be specific to a particular composition of combustible gas. Such diagrams are well-known in the technical literature, such as discussed in, for example, "Explosions" W. Bartknecht, Springer-Verlag, New York, 1981 (in particular, see Chapter 2, Explosions in Closed Vessels). Standardized testing methodologies have been developed to collect the data needed to produce such diagrams (see for example European Standards DIN EN 13673-1 and DIN EN 13673-2, September 2003). These methodologies generally require that the combustible gas mixture to be tested is initially held in a static condition, within a sealed, adiabatic, and otherwise empty (e.g., free from fill material) testing sphere.

The diagram of FIG. 8 illustrates the typical progression of the deflagration pressure (or "explosion pressure") event in a volume of combustible gas as a function of the elapsed time relative to the moment when the combustible gas is ignited. The diagram generally comprises three sequential stages.

In the first stage, prior to ignition, the gas mixture exists in a static condition at a constant initial pressure ($P_{initial}$) and initial temperature.

In the second stage, following ignition, combustion of the gas mixture is established and the flame front and associated pressure wave form and expand outward from the point of ignition. This results in a rapidly increasing pressure over time interval ?t until the maximum deflagration pressure, $P_{max}$, is achieved. Typically, time interval, ?t, of this transitional state is on the order of only about 100 to 300 microseconds in duration. Notably, heat transfer sufficient to dampen or slow the deflagration event would require significantly more time, such as on the order of about 500 to 1000 microseconds (i.e., 0.5 to 1.0 seconds).

In the third stage, following attainment of $P_{max}$, the pressure within the test sphere declines over time interval ?T until a lower, "steady-state" pressure, $P_{final}$, is reached. Typically, during a deflagration event, the time interval, ?T, necessary to reach $P_{final}$ is on the order of 1000 microseconds or more in duration.

Contrary to the teachings of the prior art, Applicants have discovered that promoting mixing within the combustible gas volume has the surprising result of lowering the maximum deflagration pressure, $P_{max}$.

Without wishing to be bound by theory, Applicants believe that the reduction in the magnitude of $P_{max}$ is a direct result of mixing that occurs during the second stage of the deflagration event, at which time the pressure wave is expanding rapidly outward from the point of ignition. This mixing is the result of the pressure wave being forced to change direction and subdivide as it passes around the pressure attenuating materials of the present invention. This mixing is believed to "blend" the pressure profile within the gas volume, reducing the differential between the peak pressure of the wave front and the lower bulk-gas pressure apart from the wave front.

Applicants further hypothesize that the time interval of the second-stage pressure increase is so short as to make heat transfer an ineffective mechanism for removing energy from the expanding flame front. Consequently, the thermal properties of any attenuating materials placed within the combustible gas volume are largely irrelevant at this early stage of deflagration, and insulating materials can be expected to perform in essentially the same way as high-thermal conductivity materials with respect to $P_{max}$ attenuation.

Finally, applicants hypothesize that the gradual decline in gas pressure that occurs over the third-stage of the deflagration event is a result of entropy driving the gas mixture to a relatively uniform pressure and temperature profile. Given a sufficiently-long time interval, this entropy effect ultimately results in the gas volume declining to the final steady-state pressure, $P_{final}$. It should be emphasized, however, that the utility of the method of the present invention is manifest in its capability to lower $P_{max}$, the maximum deflagration pressure, rather than $P_{final}$, the final steady-state pressure.

Although the method and apparatus of the present invention are applicable to various types of process vessels in various production processes, to facilitate discussion and understanding, they will be hereinafter described in connection with a tubular reactor used for catalytic gas phase reactions which produce products such as unsaturated carboxylic acids, unsaturated nitriles, aldehydes, etc. from hydrocarbon gases such as propane, propylene, butane, butylene, etc.

With reference now to FIG. 1, a schematic, partially cutaway elevational side view is provided of a process vessel to which the method of the present invention may suitably be applied. In particular, FIG. 1 shows a partially cut-away elevational side view of a tubular reactor 10 suitable for catalytic gas phase reactions. The tubular reactor 10 has a plurality of tubes 12a, 12b, 12c, 12d, each of which extends between a first perforated plate 14 and a second perforated plate 16, and contains solid materials S, such as one or more types of catalyst and inert materials. The plurality of tubes 12a, 12b, 12c, 12d, as well as the first and second perforated plates 14, 16, are enclosed in a shell 18 which forms a region for circulation of heat transfer fluid (not shown per se) around the plurality of tubes 12a, 12b, 12c, 12d for temperature control purposes.

With reference still to FIG. 1, a flanged cap, or "reactor head" 24, is sealingly affixed to the perimeter of the reactor 10 proximate the first tube sheet 14, to form a defined inlet region 20 in fluid communication with the reactor tubes 12a, 12b, 12c, 12d, for allowing reactants (not shown) and other fluids to flow therethrough. Similarly, another flanged cap, or "reactor head" 26, is sealingly affixed to the perimeter of the reactor 10 proximate the second tube sheet 16, to form a defined outlet region 22, which is also in fluid communication with the reactor tubes 12a, 12b, 12c, 12d for allowing reactants, products and other fluids (not shown) to flow therethrough. Collectively, the defined inlet and outlet regions 20, 22 along with the plurality of tubes 12a, 12b, 12c, 12d form the reaction-side of the tubular reactor 10 wherein one or more chemical reactions occur, such as, for example, oxidation, during operation of the tubular reactor 10 under flowing conditions. The above-described arrangement, wherein the defined inlet region 20 is positioned at the top and the defined outlet region 22 is positioned at the bottom of the vertically-oriented tubular reactor 10, clearly indicates to persons of ordinary skill in the art that the reaction process is being operated in a "downflow" configuration. However, persons of ordinary skill will also easily recognize that the method and apparatus of the present invention are equally applicable to other process vessels, including tubular reactors operated in an "upflow" configuration (now shown per se), wherein the defined inlet region would be positioned at the bottom of the tubular reactor.

In some embodiments of the present invention, monitoring instrumentation (not shown per se) may be positioned in the defined region of the process vessel for detection of combustion, local temperature increase, or local pressure increase, such that adjustments to operating conditions may be made, including but not limited to troubleshooting, reduction in operating rates, or shut down of process. Such monitoring instrumentation may include one or more of thermocouples, pressure transducers, fire eyes, and gas composition analyzers and may optionally be connected to distributed process control systems in order to initiate an automated response. In some embodiments, the monitoring instrumentation (not shown) may be incorporated into safety interlock logic systems along with other process calculations and measurements, such as, for example, flammability calculations or reactor feed stream flow rates. Additionally, in some embodiments, redundant monitoring devices may be used to enhance reliability of the monitoring system. If redundant devices are used, they may optionally be configured as part of a computerized voting-logic system, in which two or more measurements must simultaneously register an abnormal condition before automated action is initiated.

In one embodiment, for example, a defined inlet region (inlet head) of a down-flow tubular oxidation reactor contains ceramic sphere components and at least ten multi-point thermocouple assemblies, each of which has about 10 measurement points per assembly. Each thermocouple assembly is inserted through sealable openings in the top portion of the (inlet) reactor head, manually positioned by bending to form a predetermined series of evenly-spaced, concentric circles, and then clipped to pre-existing anchoring brackets on the inlet tube sheet. In another embodiment, a defined inlet region of an up-flow tubular oxidation reactor contains wire mesh cylinder components and at least six "K"-type multi-point thermocouple assemblies with 316 stainless steel sheaths (commercially available from Gayesco of Pasadena, Tex., USA). The multi-point thermocouple assemblies of this embodiment are inserted through SWAGELOK packing glands (commercially available from Swagelok Company of Solon, Ohio, USA) which are mounted onto the sidewall of the inlet reactor head, manually positioned by bending to lay proximate to a predetermined distribution of measurement locations, and then affixed at multiple locations along their length to the mesh cylinders, using short lengths of wire.

In still another embodiment, samples of the combustible gas feed mixture within the defined inlet region (inlet head) of an oxidation reactor are continuously analyzed by gas chromatograph to detect an increase in the concentration of combustion products, such as, for example, carbon dioxide, carbon monoxide, and water or a decrease in the concentration of combustible hydrocarbons. In yet another embodiment, the defined inlet region (inlet head) of an oxygen-enriched hydrogen cyanide reactor comprises 100% volume-fill of 40 ppi reticulated ceramic foam and also contains at least two fast-acting pressure transducers (suitable models are commercially available from Kulite Semiconductor Products of New Jersey, USA) in order to detect possible deflagrations within the defined inlet region, and to automatically initiate shutdown of the reaction system via the distributed process control system in the event a deflagration is detected. The above described embodiments of the present invention incorporating monitoring instrumentation are but a few examples and are not intended to describe the full scope of possible configurations that may be utilized in accordance with the present invention. The selection and specification of appropriate monitoring instrumentation and associated process controls, safety systems, and interlock logic systems will be within the ability of one of ordinary skill in chemical process design and instrumentation, given the benefit of the present disclosure.

Figure 2:
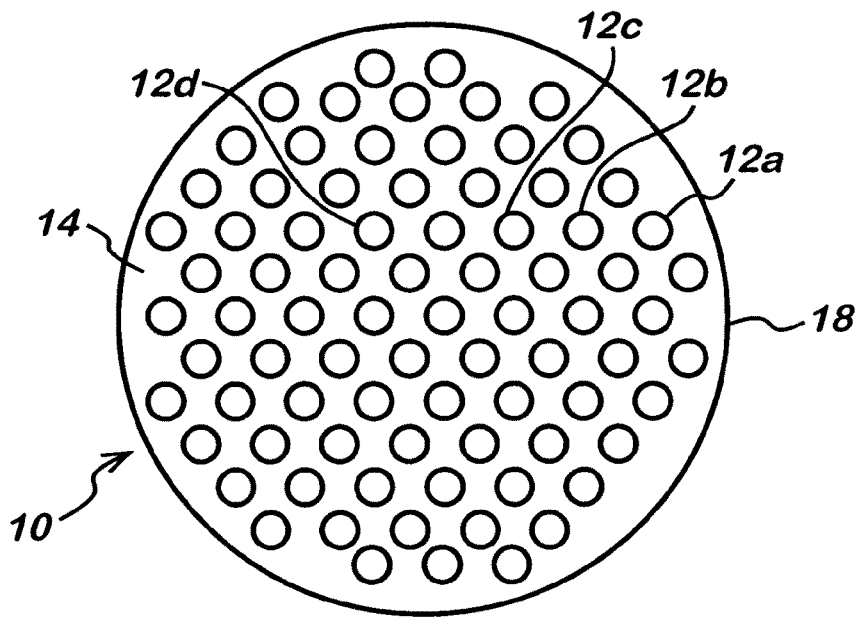
FIG. 2 is a cross-sectional schematic top plan view of the defined inlet region of the tubular reactor of FIG. 1, taken along line A-A and looking in the direction of the arrows.

FIG. 2 shows a cross-sectional schematic top plan view of the defined inlet region 20 of the tubular reactor 10 of FIG. 1, taken along line A-A and looking in the direction of the arrows. The perforated plate 14 and the plurality of tubes 12a, 12b, 12c, 12d are visible in this view. It is in this defined inlet region that the reactants and other materials fed to the tubular reactor 10 all come into contact with one another prior to entering the tubes 12a, 12b, 12c, 12d and contacting the catalyst materials S therein to commence one or more chemical reactions within the tubes 12a, 12b, 12c, 12d. Depending upon the reactants and other materials fed to the reactor 10, combustible gas may be present in the defined inlet region 20, which is susceptible to inadvertent ignition from any number of sources including, but not limited to, hot spots generated proximate to the perforated plate 14 and sparks generated by friction or contact with other apparatus present in the defined inlet region 20. As discussed hereinabove, such ignition may become a deflagration event, which may, in turn, propagate until it transitions to detonation or explosion.

It has been discovered that deflection and fragmenting of the deflagration pressure wave may slow propagation of the pressure wave and lower the maximum pressure attained by the deflagration sufficiently to quench the overall deflagration event and prevent transition to detonation and reduce the peak pressure (Pmax) achieved. Furthermore, it has been discovered that successful deflection and fragmentation of the deflagration pressure wave may be achieved by selecting and placing suitable attenuating materials in a defined region wherein combustion and deflagration are likely to occur, such as in the defined inlet region 20 of the tubular reactor 10. As will be discussed in further detail hereinafter, "suitable" attenuating materials means attenuating materials selected based on their geometry, which includes both size and shape, relative to the size and shape of the defined region.

Figure 3A:
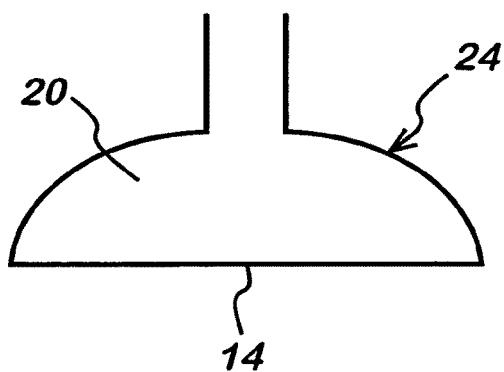
FIG. 3A is a schematic cross-sectional elevational side view of only the defined inlet region of the tubular reactor of FIG. 1, showing the inlet tube sheet and the reactor head.

For example, FIG. 3A is a schematic cross-sectional elevational side view of the empty defined inlet region 20, i.e., without any attenuating materials placed therein, which correlates to attenuating materials occupying 0% of the volume of the defined inlet region 20. As described above, the defined inlet region 20 is shown bounded by the inlet tube sheet 14 and the reactor head 24. As will be described in further detail hereinafter, FIG. 3B shows one embodiment of the present invention wherein the defined inlet region 20 of FIG. 3A contains attenuating material which comprises ceramic sphere components 28 and provides a volume-fill of at least 20% by volume of the defined inlet region 20.

Figure 3B:
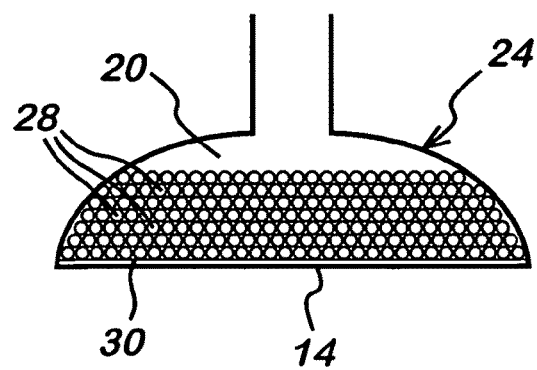
FIG. 3B is a schematic cross-sectional elevational side view of the defined inlet region of FIG. 3A, showing the inlet tube sheet and the reactor head and containing attenuating material which comprises ceramic sphere components.

In cases such as shown in FIG. 3B, where the defined inlet region 20 is located at the top of the process vessel and the process vessel is a tubular reactor with parallel vertical tubes, it is advisable to install a barrier, such as a ceramic mesh or wire screen sheet 30, across the cross-sectional area (see, e.g., FIG. 2) of the defined inlet region 20 to prevent the components 28 of the attenuating material from entering the tubes 12a, 12b, 12c, 12d through the perforated tube sheet 14 (see, e.g., FIG. 1). The use of barrier 30 is especially beneficial because it allows an empty space, or "void region," to be maintained in the uppermost section of each of the tubes 12a, 12b, 12c, 12d, where the tube ends pass through the first tube sheet 14. Because of the typically large thickness of the tube sheets 14, 16 in such tubular reactors used for oxidation reactions, there is limited cooling in this uppermost section of each tube. Thus, if this region contained attenuating material, oxidation catalyst, or even inert diluent materials, it would be subject to overheating which may, ultimately, cause failure of the welded connection between the tube and tube sheet 14. In addition to the cost of repairs, such failure of the welded connection between the tube and tube sheet 14 can also result in cooling salt leaks from the shell side of the tubular reactor 10 into the defined inlet region 20 formed by the reactor head 24. As disclosed in US Patent Application Publication No. 2006/0292046, the release of cooling salt typically comprising nitrates and nitrites (e.g., HITEC salt commercially available from DuPont of Wilmington, Del., USA) into the defined inlet region 20, and the subsequent decomposition reactions that occur, will culminate in the undesirable autoignition of the propylene oxidation reactor feed gas.

In one embodiment of the present invention (not shown per se), to form a suitable barrier 30, a layer of 50-millimeter ("mm") (2-inch) thick, (40 pores per inch ("ppi")) reticulated ceramic foam tiles are placed directly on the inlet tube sheet of a downflow propylene oxidation tubular reactor to form a continuous barrier covering the total cross sectional area of the tube sheet, preventing any of the attenuating material from falling into the ends of the tubes. A void region, i.e., empty of any materials, and which is equivalent in length to the thickness of the reactor inlet tube sheet, is therefore maintained in the upper tube ends of each reactor tube, such that overheating of the welded connections between the tubes and tube sheet is avoided. Attenuating material (not shown) comprising 13 mm (½-inch) DENSTONE 2000 support spheres (commercially available from Saint-Gobain Norpro of Stow, Ohio, USA, formerly known as and now merged with Norton Chemical Process Products Corp.) are then placed in the defined inlet region, on top of this barrier, to attenuate deflagration pressure in accordance with the present invention. In such an embodiment, the reticulated ceramic foam tiles may be considered part of the attenuating material, along with the DENSTONE spheres. The attenuating material, in this case, the ceramic foam and the spheres, should occupy at least 20%, for example, at least 25%, or even at least 30% or at least 50% of the total volume of the defined inlet region 20, wherein the volume occupied by the attenuating material is the sum of the volume of the components of the attenuating material and the volumes of the void spaces therebetween. In other words, an amount of attenuating material is placed in the defined region which provides at least 20% volume-fill in the defined region.

In particular, but without wishing to be bound by theory, contrary to the understanding commonly held in the art that mixing and increased turbulence of combustible gases should be avoided during deflagration because they will accelerate propagation of the flame front and increase the peak pressure achieved and, thereby, hasten transition to detonation, it has been discovered that increasing lateral mixing of the combustible gas, while minimizing axial mixing, serves to deflect and fragment the pressure wave, and thereby remove energy from the deflagration sufficient to lower the maximum pressure attained, slowing propagation of the pressure wave and flame front, and preventing transition to detonation. "Axial mixing" is mixing that increases turbulence in the axial direction, which is the direction in which the pressure wave and flame front are propagating, while "lateral mixing" is mixing that increases turbulence of the combustible gas in directions other than axially, for example, without limitation, substantially perpendicular to the axial direction. It has been found that such lateral mixing is desirably increased as solid or tortuously porous attenuating materials that have smaller effective diameters are used, however, this preference for smaller materials is limited somewhat by the need to avoid too great a pressure drop in the throughput of reactants which occurs when very small materials are used. For example, sand may provide excellent attenuating and fragmentation of a pressure wave, but it will also cause an enormous and generally unacceptable pressure drop during normal operation of the reactor and, therefore, would not typically be a good choice as the only attenuating material.

Also contrary to the widely held understanding by persons of ordinary skill in the relevant art that the key to deflagration, detonation and explosion protection is heat transfer and removal, it has been found that successful deflection and fragmentation of the deflagration pressure wave, which ultimately reduces the intensity of the deflagration event and avoids detonation, rather than being totally controlled by heat transfer forces, is also highly dependent on: (1) the shape and size, i.e., the geometry, of attenuating material components placed in the defined region containing combustible gas and (2) the dimensions of the defined region itself. Thus, surprisingly, it has been determined that the material of construction of the attenuating material components (and therefore its associated thermal conductivity) is less important than its geometry with respect to the attenuation of maximum deflagration pressure achieved after ignition, Pmax. Some metal materials that were assumed would successfully quench deflagration and prevent detonation actually performed poorer in comparison to non-metallic materials of more appropriate shape and size. Furthermore, some geometries have proved to be significantly more effective than others, for example, geometries that present minimal axial pathways through which combustible gases may pass (e.g., solid spheres), or present more tortuous and shorter axial pathways (reticulated foam, tightly rolled wire mesh material), tend to deflect and fragment deflagration pressure waves better than materials having geometries that present open, extended axial pathways when placed into the defined region containing the combustible gas (e.g., rings, hollow cylinders).

Generally, it is understood that minimizing axial pathways may be achieved, at least in part, by maximizing the packing factor and/or minimizing the volumetric (interstitial) void space between components of the attenuating material placed in the defined region of a process vessel, which is further known to depend upon the particular geometry (size and shape) of the attenuating material and its components. The determination and calculation of packing factors and volumetric void space is well within the skill of persons having ordinary skill in the art with reference to basic texts and treatises. For example, bulk density & void fraction data can be measured empirically (fill a fixed volume with material, determine the mass of the material used, and then divide by the density of a single particle to ascertain how much free space there is included on a % basis). However, many suitable components are commercially available materials used as separations column packing or regenerative thermal oxidizer heat transfer bed material, and suppliers freely publish this data for such materials. Additionally, there are many reference texts that discuss the more common packing materials and associated packing fraction data can be looked up (vs. calculated)—see, for example, Table 23-1 (page 710) of Unit Operations of Chemical Engineering, 3rd Ed., W. L. McCabe and J. C. Smith, 1976, McGraw-Hill, New York.

The degree of success achieved by a particular type of attenuating material, having a selected geometry and material of construction, is assessed, at least in part, by its ability to decrease the maximum pressure (Pmax) attained by a deflagration pressure wave in combustible gas in an otherwise empty defined region, as compared to the maximum pressure attained in the combustible gas under the same operating conditions in the same defined region when filled with the attenuating material. Example 1 hereinbelow provides data showing that 2-inch (50.8 mm) Pall rings placed in a defined region surprisingly increased, rather than decreased, the maximum deflagration pressure attained by combustible gas ignited in the defined region, as compared to an empty defined region. The results of the experiments described in Example 1 also demonstrate that layers of crimped wire mesh in the defined region, which appear to have provided a significantly larger total surface area, consistently decrease the maximum deflagration pressure after ignition of the combustible gas, but, notably, fail to extinguish combustion via heat removal mechanisms.

FIGS. 4A-4C and 5A-5J are each a series of graphical images produced by computer model software, showing the progression of a deflagration Pressure Wave Front (PWF), at various time intervals not exceeding a total elapsed time of 200 microseconds, beginning with ignition at a single point (P) in a defined region (DR). The defined region is the dome-shaped inlet region of a tubular reactor vessel (such as was discussed above in connection with FIGS. 1-3). The images of FIGS. 4A-4C and 5A-5J display the defined region from a side view, similar to that provided in FIGS. 3A & B. The shading of the pressure wave varies with pressure such that the darker grey color of a portion of a pressure wave indicates a higher localized pressure than in other portions of the pressure wave. For example, in FIG. 4B it can be seen that the leading edge (PWF) of the deflagration pressure wave front is a dark shade of grey compared to the slightly lighter, but not particularly light, shade of grey seen behind the leading front and closer to the point of ignition (P).

Figure 4B:
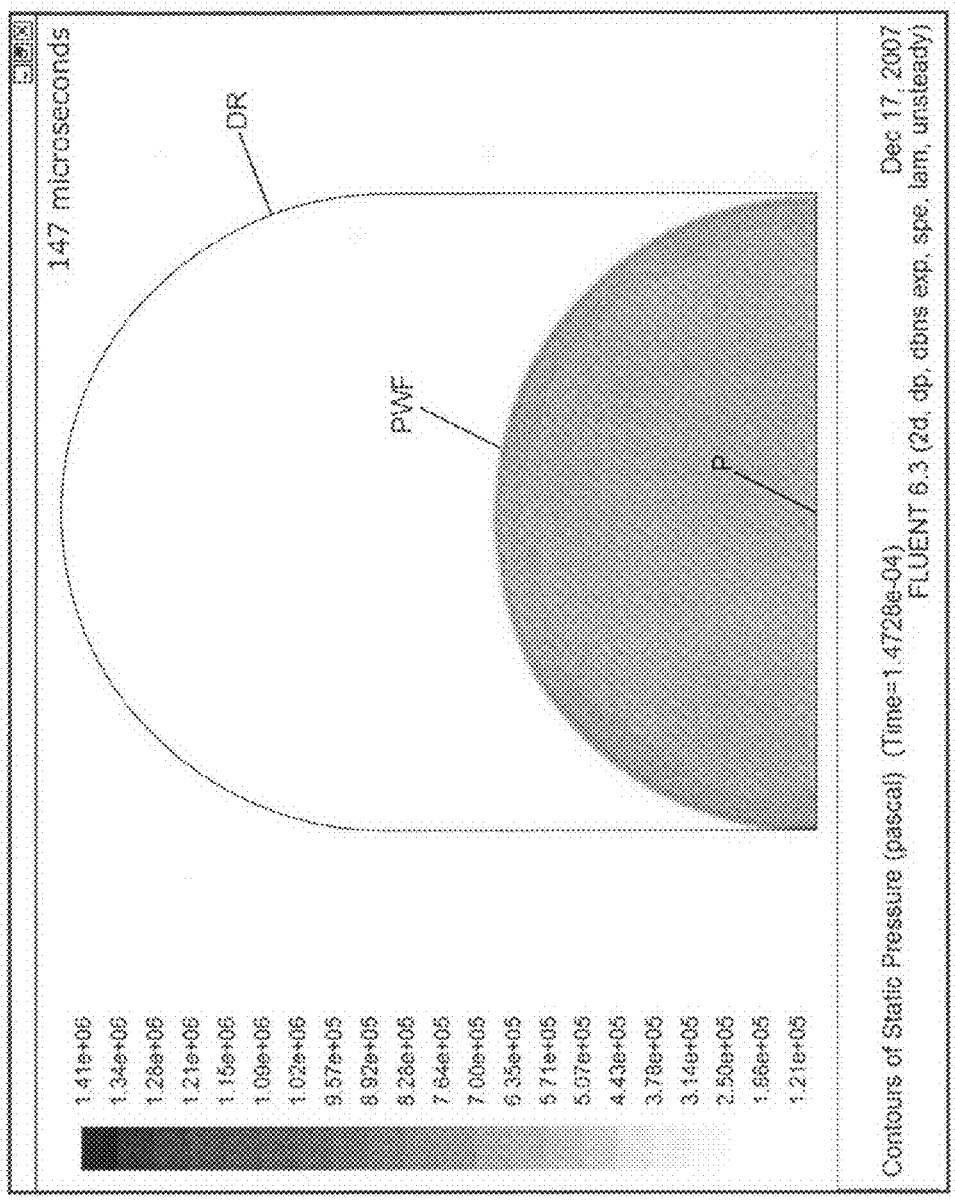
Figure 5B:
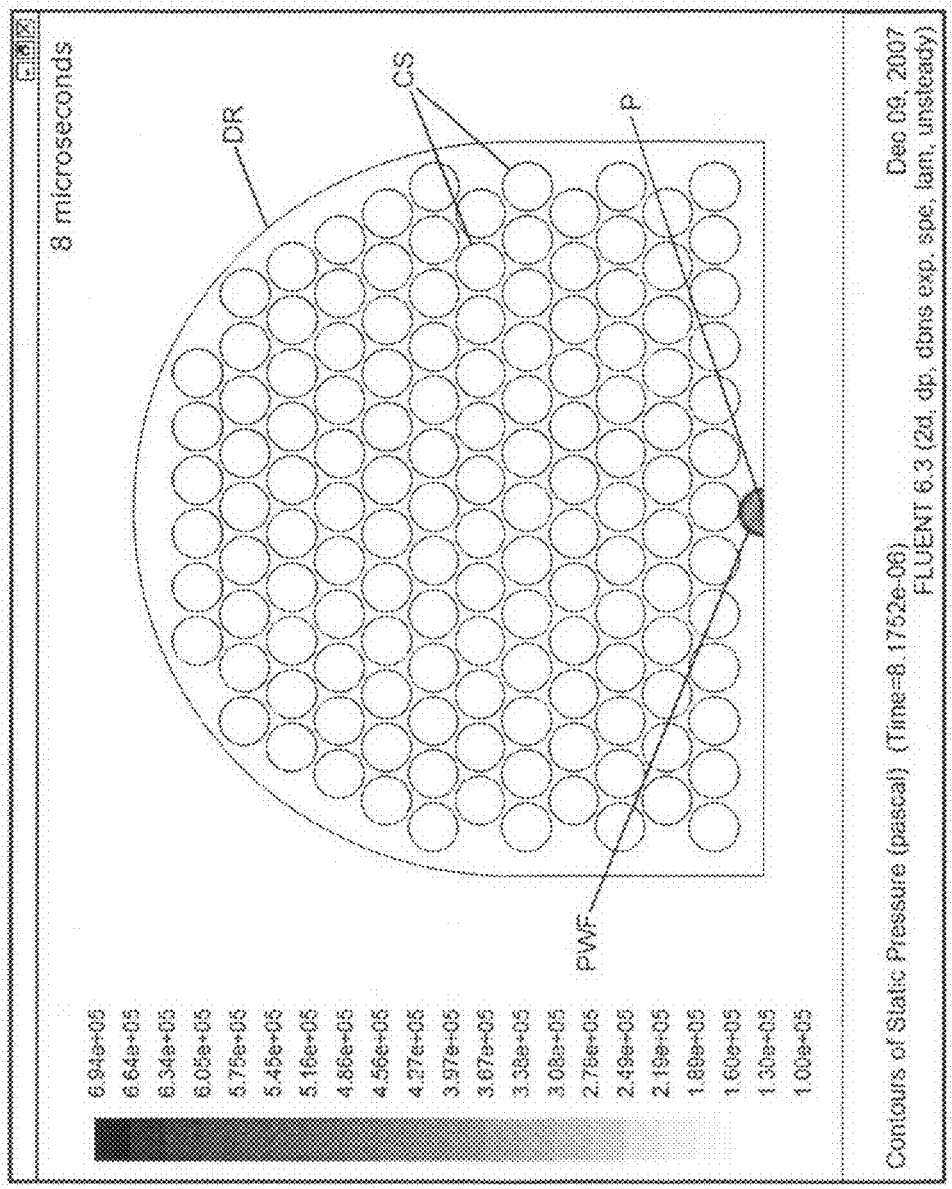
Figure 5D:
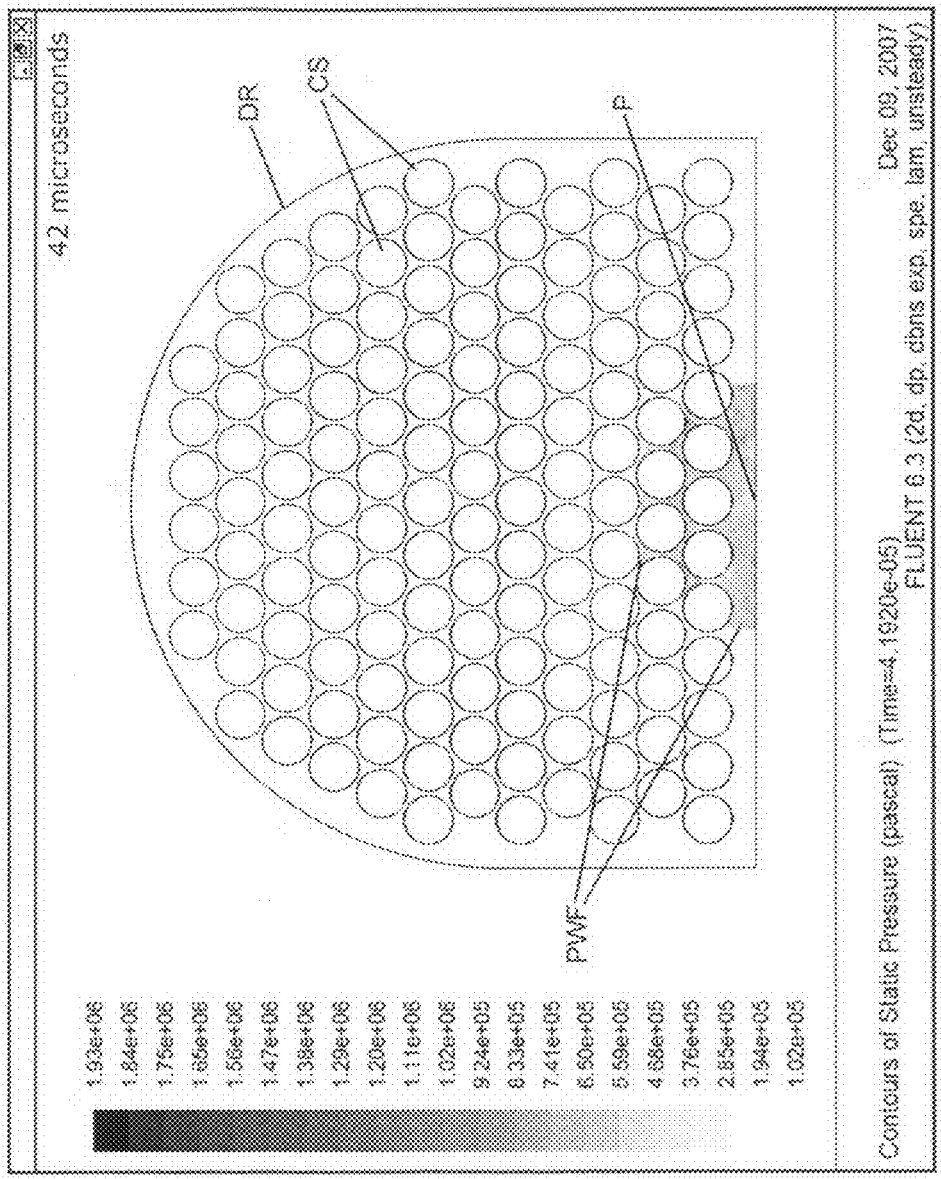
Figure 5E:
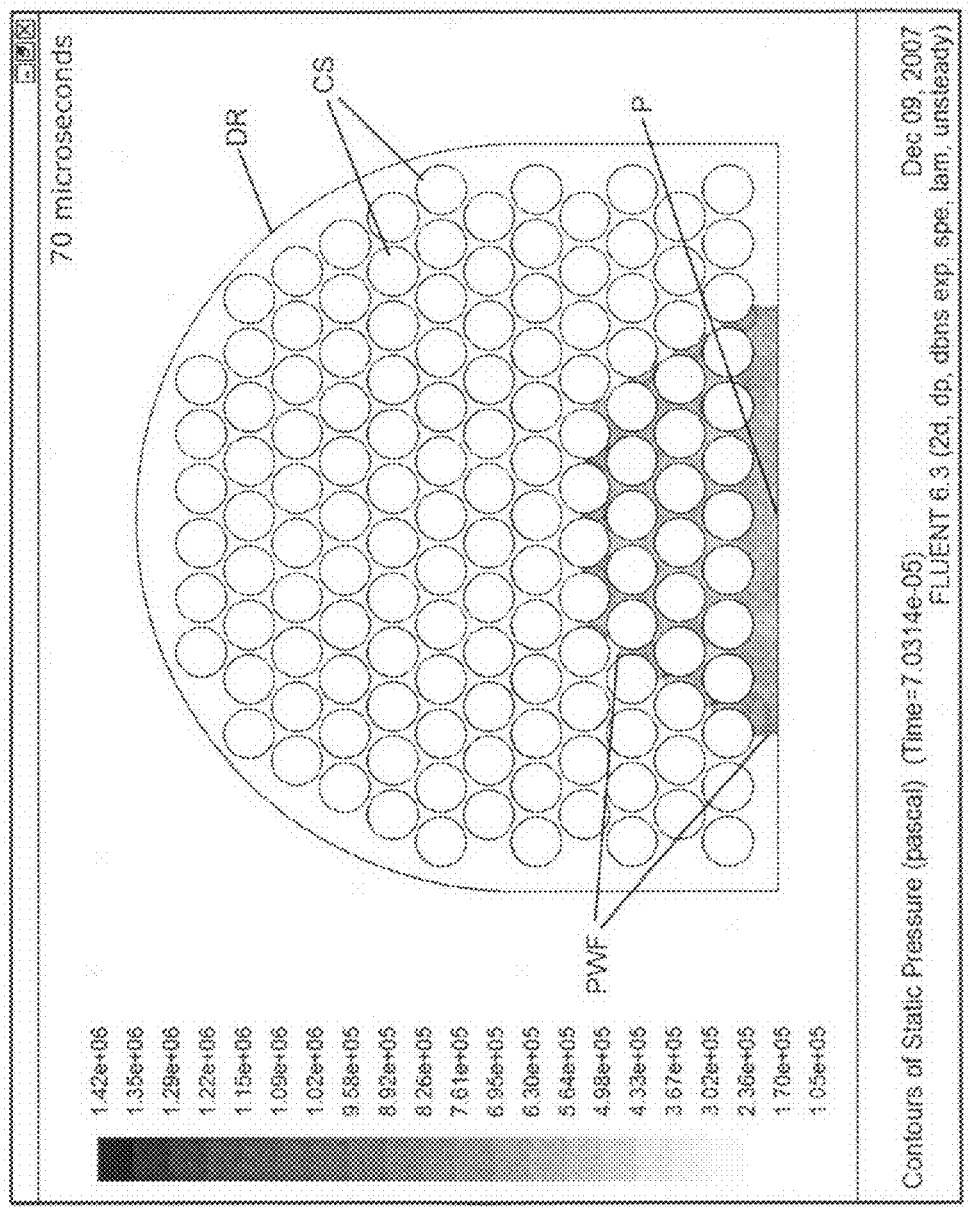
Figure 5G:
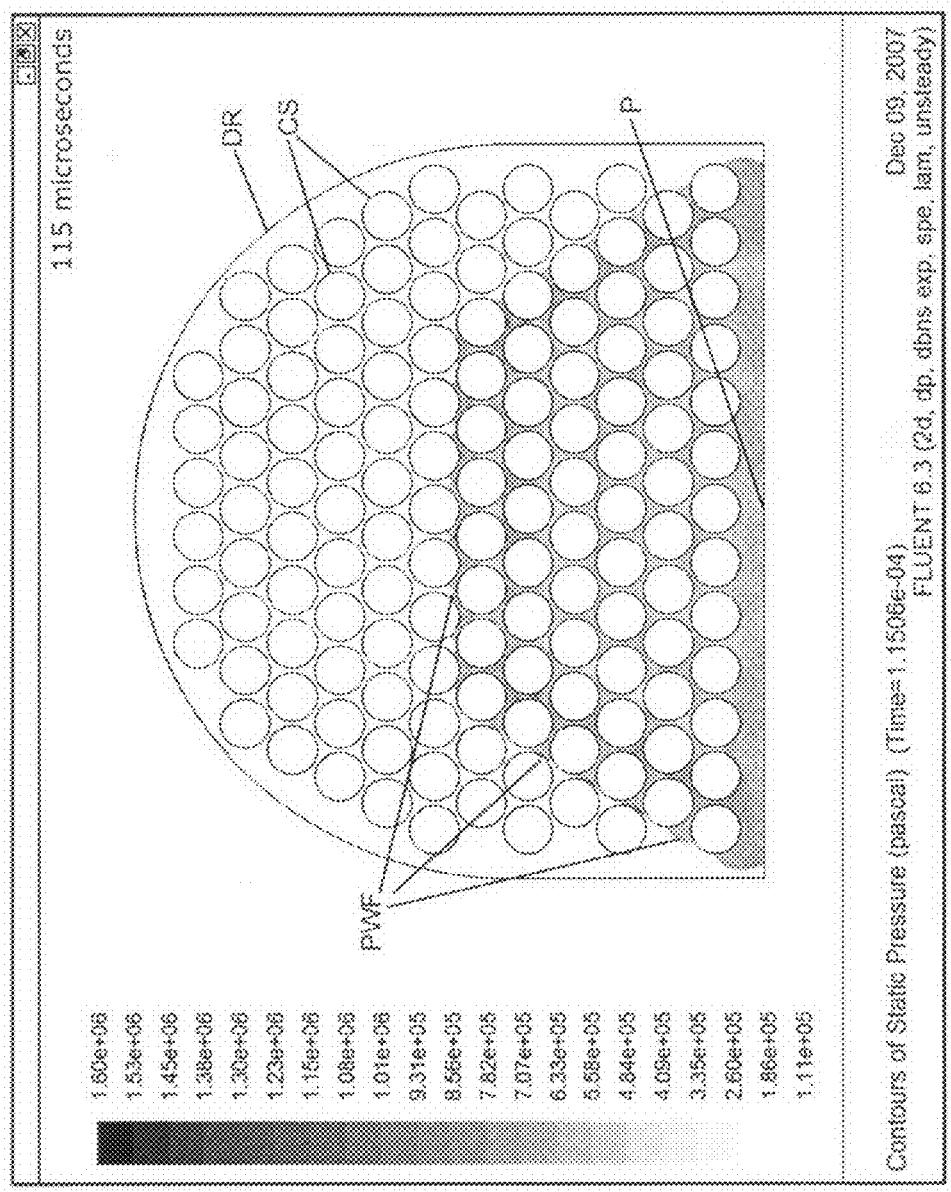
Figure 5I:
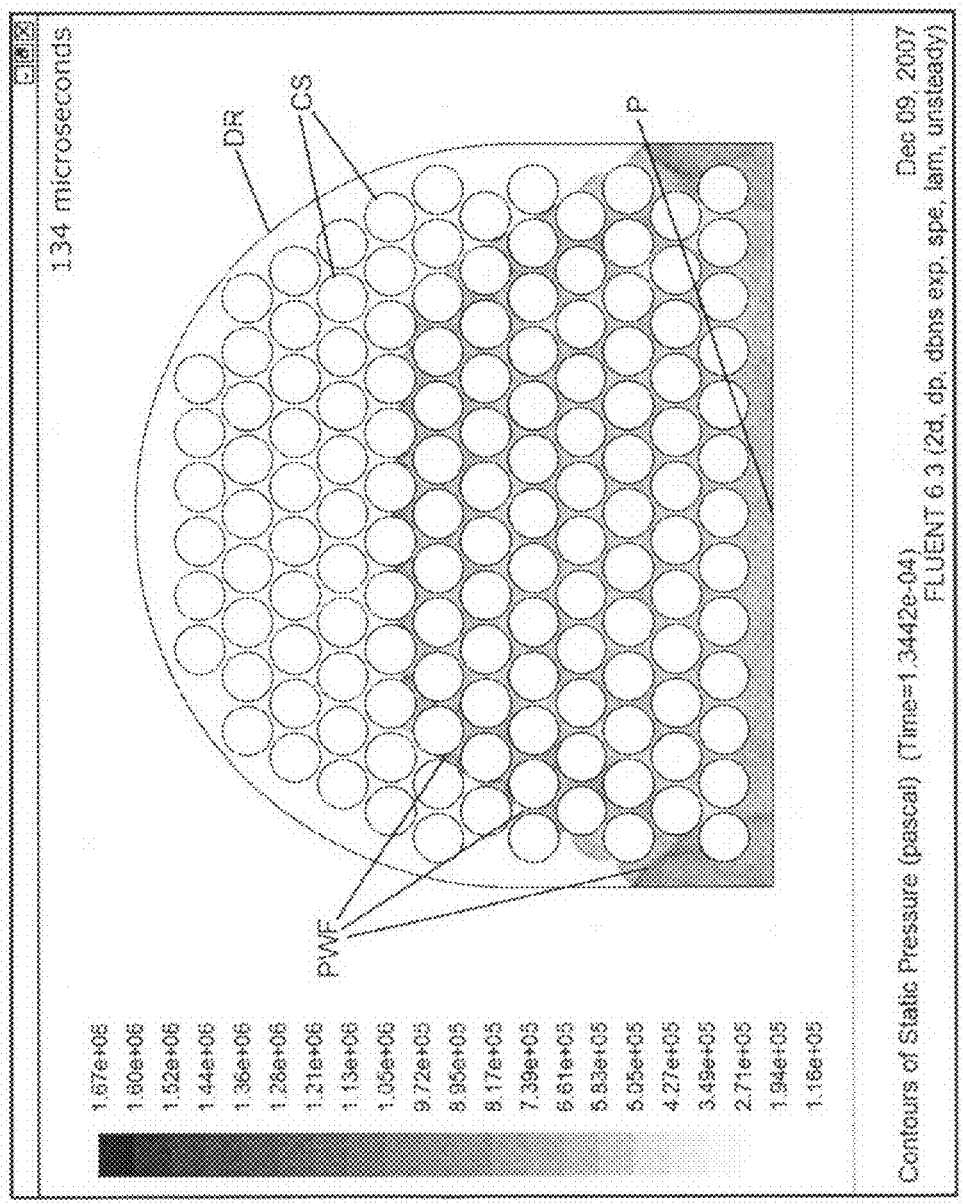
Figure 5J:
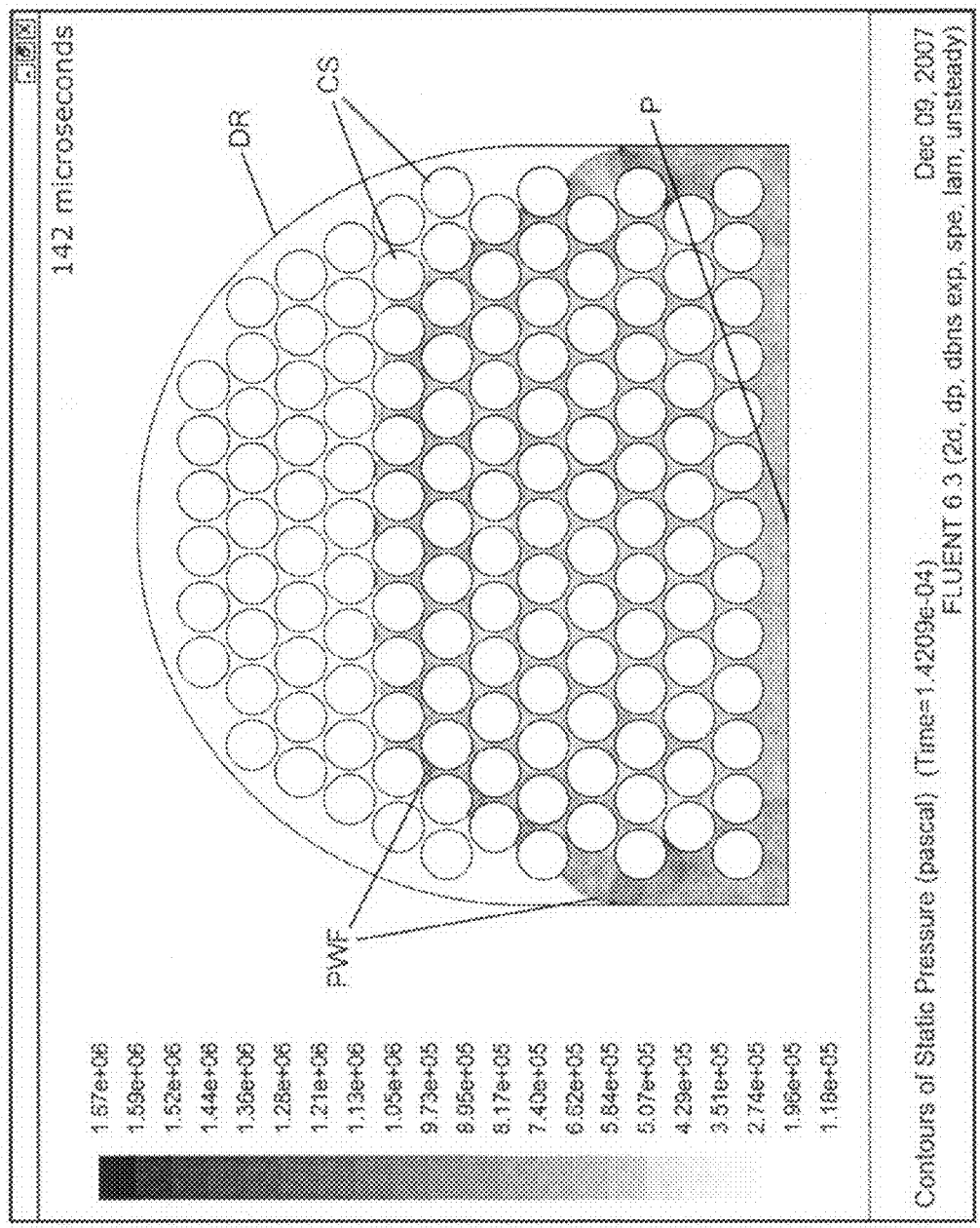

In particular, the series of images in FIGS. 4A-4C show the progression of a deflagration pressure wave front (PWF) from the point of ignition (P) in the defined region (DR) containing no attenuating materials. In an empty vessel, the deflagration pressure wave front propagates through the empty vessel, steadily in all directions away from the ignition point, as shown in FIGS. 4A-4C, by the semi-circular leading edge of the PWF. FIGS. 5A-5J show the progression of a deflagration (PWF) from the point of ignition (P) in the defined region (DR), but the defined region (DR) now contains attenuating material comprising ceramic spheres (CS). It can be seen from reviewing FIGS. 5A-5J that the deflagration pressure wave front still proceeds outwardly in all directions from the point of ignition, but that the smooth, continuous, semicircular wave front is deflected and fragmented when it contacts the attenuating material. Even though a maximum deflagration pressure (Pmax) is still achieved when attenuating material is used, the Pmax reached is less than the Pmax reached by the deflagration in the empty test vessel. It can also be seen that the propagation of the deflagration pressure wave front takes very little time—on the order of a couple of hundred microseconds. This indicates that lateral deflection of the deflagration pressure wave by some kind of attenuating material comprising solid components decreases the maximum pressure ultimately reached by the pressure wave.

As stated previously, it has been found that a feature more relevant than heat transfer impacts the capacity of the attenuating material to fragment the deflagration pressure wave sufficiently to avoid detonation: the geometry of the components of the attenuating material, relative to the shape and size of the defined area of the process vessel. The "effective diameter" is a quantifiable characteristic of attenuating material having a plurality of components, such as ceramic spheres, or Pall rings, etc., which was developed by the inventors to quantify the cross-sectional profile of each component of the attenuating material available for impeding the propagation of the pressure wave front during deflagration. Without wishing to be limited by theory, the "effective diameter," as used herein, is analogous to the "hydraulic diameter" concept which is known by persons of ordinary skill in the art of flame arrestor design. The concept of hydraulic diameter provides means to quantify the effect of geometry and surface area of non-circular pipes and conduits with respect to the removal of thermal energy from fluids flowing through them. Similarly, the concept of "effective diameter" has been developed to provide analogous quantification of the effects of geometry of attenuating material having non-spherical components on the propagation of a pressure wave front therethrough, as compared to generally spherical components, which present a consistently circular cross-sectional profile as an impediment to pressure wave propagation.

"Generally spherical components" means components with an exterior geometry that, when inscribed within a sphere, occupies more than about 50% of the enclosed volume of the sphere (=inscribed volume ratio >0.50). For example, in the case of a cube, the inscribed volume ratio is about 0.68 and for a 'DENSTONE cylinder' with L:D roughly equal [(e.g., L=0.375 inch: D=0.25 inch, volume=0.0184 cubic inch; Ds=1.14 cm, so sphere volume=0.0479 cubic inch; & ratio is then 0.0184/0.0479=0.3840], it is about 0.38. Mathematical calculation of the inscribed volume ratio can be readily accomplished by those of ordinary skill in geometry and trigonometry. Such calculations are of course simplified when the geometry of the particle involved includes one or more axes of symmetry, such as occurs with solids of revolution. In the case of multi-faceted particles resembling regular polyhedra, the surface shape begins to approximate a sphere as the number of faces increases and the inscribed volume ratio approaches 1.

The "effective diameter" of the components of attenuating material, as this term is used herein, means the average diameter of a sphere in which a single average component is inscribed. "Equal effective diameter" means an effective diameter that is numerically the same to within a measurement tolerance of about +/−5%, for example, or even 10% or 20%.

Applicants have discovered that both the geometry and effective diameter of the individual pressure attenuating components (e.g., component geometry), as well as the ordering or packing of these components relative to one other can affect the degree of pressure attenuation achieved in a particular process vessel. Generally speaking, the smaller the effective diameter of the components, the greater the pressure attenuation. Additionally, applicants have found that multiple layers of the components of attenuating material produce a greater degree of deflagration pressure attenuation than a single layer of components, and that the greatest attenuation is possible when the majority of the defined area of the process vessel is filled with attenuating material.

In the case where multiple layers of particles are used to attenuate the deflagration pressure with a process vessel, it is preferred that the multiple layers of such particles are organized into a well-ordered bulk geometry which minimizes "channeling." Channeling means development of relatively unobstructed flow of fluid along the path in a configuration of obstacles or equipment which presents at least semi-contiguous passageways through which the fluid can easily and steadily flow, rather than being deflected or hindered.

In an ideal case, only perfectly smooth, uniformly spherical particles of exactly the same diameter would be used, because such particles will self-assemble, or "self order," into a bulk geometry with uniform face-centered cubic orientation. This self-ordering behavior is desirable because it provides the benefit of a well-ordered bulk geometry, presenting few or no contiguous openings through which fluid may flow, without the need for significant manual adjustment of the components. Attenuating materials whose components tend to be self-ordering enable the efficient filling of a vessel by simply pouring or dumping of attenuating material into the defined area of the process vessel.

Fortunately, applicants have discovered that attenuating material comprising generally spherical components of equal effective diameter approximates this ideal-sphere behavior quite well, with particles that have higher inscribed volume ratios most closely approximating this ideal sphere behavior.

Thus, as will be described hereinafter in further detail, it is now possible for persons of ordinary skill to perform the steps of: selecting a particulate material of a given size, verifying its pressure attenuation performance in a laboratory test sphere, and then placing this exact (as-tested) material into a much larger, commercial-scale process vessel to obtain the benefit of deflagration pressure attenuation.

In the case where attenuating material comprising generally spherical particles, of equal effective diameter are utilized, it may be desirable to utilize attenuating material having larger-sized components than those tested in the laboratory apparatus. This is because the pressure drop of a given gas flow through a collection of components can be minimized when the effective diameter of the components is large. High pressure drop requires increased pressurization of the gas fed into the process vessel (through, for example, the use of a gas compression system), which is costly. In addition, increased pressurization of the gas feeds has an adverse effect on the flammability limits and autoignition temperature of the system. Unfortunately, the objective of minimizing pressure drop is in direct opposition to the objective of maximizing pressure attenuation through the use of small particles (as stated above) and it becomes difficult in practice to rectify this situation without performing a prohibitively large number of expensive laboratory tests.

Fortunately, applicants' extensive investigations have unexpectedly and surprisingly shown that it is possible to predict the behavior of attenuating material comprising components with a different effective diameter than the components of the attenuating material actually tested in the laboratory. More particularly, the method of the present invention has been developed, with which persons of ordinary skill may perform a relatively few laboratory tests and then scale-up the results to select appropriate effective diameters for the components of the attenuating material in large commercial-scale vessels. This method involves the determination of the Deflagration Mixing Factor (DMF) for given particle geometries.

The DMF provides a basis for identifying the maximum effective diameter that may be used in a given process vessel in order to obtain deflagration pressure attenuation. Without such a method, it would be necessary to construct full scale testing systems in the laboratory in order to obtain this information. Given that many process vessels may be 20 or more feet (6.1 or more meters) in diameter, such a testing approach is impractical. In our example, solid, hollow ceramic balls of 3.6 inches (9.14 centimeters) diameter can be effectively used in a commercial vessel having a diameter of 22 feet (6.7 meters), based on successful testing of ¼-inch DENSTONE spheres in the 10 liter laboratory testing vessel. Just as the maximum deflagration pressure, Pmax, of an empty vessel is dependent on the initial state of composition, temperature, and pressure of the combustible gas within the defined region of the process vessel, so too is the relationship of DMF value vs. Pmax for a given attenuating material component. However, once the initial state of composition, temperature, and pressure of the combustible gas within the process vessel is fixed, the DMF vs. Pmax relationship is also fixed.

It will be apparent based on the examples provided hereinafter, wherein a combustible gas mixture comprising propylene at 35 pounds per square inch gauge ("psig") and 225° C. (437° F.) was used, that particles with a DMF greater than about 14 will not provide significant deflagration pressure attenuation to keep the peak pressure below the desired maximum allowable vessel pressure and so should not be selected.

The method of the present invention has been developed for use with attenuating materials having generally spherical components of equal effective diameter. We believe that the method most accurately predicts pressure attenuating behavior when the inscribed volume ratio is high and, therefore, it is preferred to use attenuating materials having components with an inscribed volume ratio of >0.3 (DENSTONE cylinder), more preferably, components with an inscribed volume ratio of >0.6 (cube), or even components with an inscribed volume ratio of >0.9 (DENSTONE spheres).

We have also determined that the method may be effectively used with attenuating material comprising reticulated ceramic foam components, wherein the diameter of the average pore size is substituted for the effective diameter of a spherical component. For example, ceramic foam with a nominal porosity of 20 pores per inch ("ppi") would have an effective diameter of 1.27 mm (25.4 mm/20).

The method will also be reasonably effective at predicting the behavior of a attenuating material comprising a mixture of two generally spherical components, such as, for example, DENSTONE spheres and DENSTONE cylinders. If the effective diameters of the two component types are the same, the mixture will approximate the performance of a single component-type attenuating material, and the accuracy of that prediction will be best at smaller effective diameters.

In an embodiment where two generally spherical components of different effective diameters are utilized for the attenuating material, it is preferred that the ratio of the component diameters ($D_{large}/D_{small}$) be at least 100, for example, at least 1000. Differences in diameters can negatively impact the ordering of the component layers, creating channel-like voids at the interface region between two adjacent (different sized) particles, which of course diminishes the local pressure attenuation in that region. As the size difference increases, the large diameter component begins to have less detrimental effect on the pressure attenuation, because the smaller particles can more easily pack into the interface regions between the large diameter particles. In the limit of very large size differences, the large component's radius of curvature becomes slight in the interface region and the geometry of the large component is equivalent to the vessel wall relative to adjacent small components. This approach of using very different sized 'particles' is especially valuable when filling the entire volume with small particles is a problem (for example, where components are so dense that maximum weight limitations for the process vessel are exceeded), and the larger component has a density less than the density of the small component, such as where the larger component is hollow.

It is further noted that other large internal structures, such as ceramic fiber blankets or the conical insert described in U.S. Pat. No. 6,649,137 (see FIG. 20), may be placed in the defined area of the process vessel, along with suitable attenuating materials in accordance with the method of the present invention. Use of other large internal structures reduces the volume of the defined region of the process vessel, thereby reducing the quantity of attenuating material needed to fill the defined region and, in turn, decrease the total weight of materials added to the defined area, while still achieving an effective degree of attenuation of deflagration pressure.

In one aspect of the present invention, a method is provided for attenuating deflagration pressure produced by combustion of combustible gas in a defined region of a process vessel. For example, without limitation, the process vessel may be, as shown in FIG. 1, a shell and tube reactor used for catalytic oxidation of hydrocarbons, and the defined region may be the inlet region of the reactor, bounded by the reactor head 24 and first tube sheet 14. The process vessel has a maximum allowable containment pressure, P(c) (often provided by the manufacturer as part of the design and operating specifications) and the defined region has a cross-sectional radius, R(v). The process vessel is operated under known operating conditions which comprise initial feed gas composition, temperature and pressure. The initial feed gas composition may further comprise a flammable mixture of hydrocarbons and oxygen under said operating conditions. After ignition of the combustible gas, a deflagration pressure wave propagates and attains a peak pressure P(max) in the defined region. In general, the deflagration pressure resulting from the aforesaid ignition is attenuated by selecting and placing suitable attenuating material in the defined region of the process vessel. Suitable attenuating material maintains its physical shape under the operating conditions of the process and has a plurality of components. The components of the attenuating material have a effective diameter and may also have a geometry.

The first step of the method according to the present invention is determining the maximum effective diameter of components of the attenuating material which is suitable for use in the defined region of the process vessel wherein a particular combustible gas will be present. This is accomplished by developing empirical data comprising associated pairs of peak deflagration pressures and deflagration mixing factors, which demonstrates a linear relationship between a plurality of attenuating materials, at least one of which has components with an effective diameter which differs from the effective diameters of the components of the other attenuating materials, and the peak pressures reached after ignition of combustible gas having the same composition as the initial feed gas composition.

More particularly, the empirical data comprising associated pairs of peak deflagration pressures (Pmax) and deflagration mixing factors (DMF) is developed by performing multiple experimental tests using a test sphere and a combustible gas of known, consistent composition and fixed conditions of initial combustible gas temperature and pressure, for each experiment. The test sphere has a radius, R(ts) and is equipped with sensors and detectors for collecting and recording temperature and pressure data during the experimental tests. During each experimental test, the test sphere is filled with the combustible gas, at known operating conditions, such as initial pressure and temperature, and then the combustible gas is ignited. The combustible gas may comprise, for example, without limitation, one or more hydrocarbons and oxygen. The maximum, or "peak", deflagration pressure achieved during the deflagration is measured and recorded for each experimental test. Initially, the test sphere contains no attenuating materials when the combustible gas is fed to the test sphere and ignited. The peak deflagration pressure, Pmax(0), resulting from ignition of the combustible gas in the absence of any attenuating material is recorded and the sphere evacuated in preparation for the next experimental test.

At least two subsequent experimental tests are conducted with the test sphere being filled with the same composition of combustible gas, but with different attenuating materials in the test sphere for each test. The peak deflagration pressure is recorded for each attenuating material tested. More particularly, the test sphere is filled with a first selected attenuating material having a first effective diameter, Ds(1), then the combustible gas is provided and ignited, after which a first peak deflagration pressure, Pmax(1), associated with the first selected attenuating material, is recorded. At least one more experimental test is conducted wherein the test sphere is filled with a second selected attenuating material having a second effective diameter Ds(2), then the combustible gas is provided and ignited, after which a second peak deflagration pressure, Pmax(2), associated with the second selected attenuating material, is recorded. If desired, additional experimental tests may be performed, using additional types of attenuating materials with different effective diameters. As will be easily understood by persons of ordinary skill in the relevant art, additional experimental tests will provide additional empirical data, which would be expected to provide a more robust and reliable model for determining the type and size of attenuating material to use in an actual industrial scale process vessel, but to produce a linear model such as the one utilized herein, a minimum of two data points is required. Of course, the same data may be obtained by testing a attenuating material of a specific geometry, repeatedly in test spheres of varied volume (e.g., having different radii), for example, one test sphere of 5 liters, another of 10 liters, and another of 20 liters volume.

Of course, as will be readily recognized by persons of ordinary skill in the relevant art, if the resulting Pmax of the first experimental test using attenuating material demonstrates that the particular attenuating material tested provides sufficient reduction in Pmax, such that the Pmax is less than the design pressure of the process vessel in which it is to be used, then it is not strictly necessary to perform additional tests with differently sized attenuating materials. Rather, these results would support the conclusion that attenuating material having the same geometry and effective diameter as the material tested in the first experimental test would be suitable for placement in the defined region of the process vessel for attenuating deflagration pressure therein, in accordance with the present invention. Thus, attenuating material of the same geometry and effective diameter as the tested material may be placed in the defined region in a quantity which provides at least 20% volume-fill. There will be a pressure drop across the defined region as a result of placing the attenuating materials therein, however, if the amount of pressure drop is acceptable, then further experimental testing can be avoided. The extent of deflagration pressure attenuation has been found to be dependent on the quantity of attenuating material used (i.e., the percentage volume-fill within the defined region); thus, the greatest reduction in Pmax for any given attenuating material will be obtained when 100% volume-fill of that specific attenuating material is used. As noted in Example 3, the use of less than about 20% volume-fill provides little if any measurable reduction in Pmax and is not recommended. It will, therefore, be apparent to one of ordinary skill, given the benefit of the present disclosure, that when multiple experimental tests are performed to create a linear model such as the one described above, a more robust and reliable model will be obtained if all experiments are performed using the same percentage of volume-fill within the test sphere. Additionally, if it is desired to utilize the method of the present invention with less than 100% volume-fill of attenuating material within the process vessel, it is recommended that experimental testing be performed using the equivalent quantity of attenuating material in the test sphere. For example, if it is desired to utilize a 50% volume-fill of a given attenuating material in a given process vessel, experimental testing should be performed with an equivalent 50% volume-fill in the test sphere in order to obtain the most representative experimental data for scale-up.

With regard to the attenuating material, the geometry of the components of the attenuating material may be, for example without limitation, one or more of the following shapes: spherical, oval, cylindrical, saddle-shaped, block-shaped, elongated and polyhedral, and should have at least one characteristic selected from the group consisting of: solid, hollow, porous, and having at least one through passage. Furthermore, the attenuating material may be made of at least one type of material selected from the group consisting of: ceramic, mineral, metal, and polymer. Furthermore, it may be more informative to select the first and second attenuating materials such that the geometry, in particular, the effective diameter (Ds(1)), of the components of the first selected attenuating material is different from the geometry, i.e., the effective diameter (Ds(2)), of the components of the second attenuating material.

Next, for each peak deflagration pressure (Pmax(0), Pmax(1), Pmax(2). Pmax(n), where "n" is the total number of experimental tests performed with the test sphere), a corresponding deflagration mixing factor (DMF(0), DMF(1), DMF(2), . . . DMF(n), where "n" is the total number of experimental tests performed) is calculated, using the following formula:

$$DMF(n)=(Ds(n)/Rts) \times 40$$

wherein n=0, 1, 2 . . . n, and Ds(n) and R(ts) are each measured in centimeters.

Now that a bivariate (x, y) data set has been developed, the approximate linear relationship between the peak deflagration pressure Pmax(n) and the deflagration mixing factor DMF(n) for materials of similar geometry but different effective diameters can be determined (i.e., linearization) using the algebraic technique, well known to persons of ordinary skill in the art, which requires solving the following equation, based on the data pairs, to determine the constant values for variables M and B:

$$P\max(n)=M \times DMF(n)+B$$

wherein n=0, 1, 2 . . . n.

Once the values of constants B and M have been calculated, and knowing the maximum allowable containment pressure (P(c)) of the process vessel from the manufacturer's design information, the maximum deflagration mixing factor (DMF(a)) that can be contained in the process vessel is calculated, using the known values of B, M and (P(c)):

$$DMF(a)=[P(c)-B]/M.$$

Finally, the maximum effective diameter (Ds(a)) of the components of the attenuating material which is expected to successfully attenuate deflagration pressure sufficiently to reduce the maximum pressure achieved (Pmax) and avoid detonation in the defined region of the process vessel, can be calculated using the following mathematical relationship:

$$Ds(a)=[DMF(a) \times R(v)]/40; \text{ and}$$

Knowing the maximum effective diameter (Ds(a)) for the components of the attenuating material, a attenuating material suitable for the particular process vessel at hand is be selected wherein, the components of the attenuating material have an effective diameter less than or equal to the calculated maximum effective diameter (Ds(a)). The selected attenuating material is placed in the defined region of the process vessel, in a manner that minimizes void spaces and open pathways between the components. The attenuating material should occupy at least 20% by volume of the defined region, for example, at least 40%, or even at least 60% or at least 80%. As discussed hereinabove, some attenuating materials comprise components which are self ordering when provided to a vessel or defined region therein, and naturally settle and align themselves such that void spaces and open pathways between them are fairly uniform and minimized. However, when the attenuating material is not self-ordering when randomly provided to the defined region of the process vessel, the step of placing them in the defined region requires manually positioning each component of the attenuating material in the defined region to minimize void spaces and open pathways between the components and make such spaces and pathways as uniform as possible.

As will be readily understood by persons of ordinary skill in the relevant art, the step of empirically determining the peak deflagration pressure (Pmax(0)) may be performed by igniting the combustible gas in the test sphere, which is otherwise empty, under the pressure and temperature of the predetermined operating conditions, and then measuring the highest pressure (Pmax(0)) reached in the test sphere, after ignition. Similarly, the step of empirically determining a first peak deflagration pressure (Pmax(1)) may be performed by igniting combustible gas in the test sphere, after filling it with the first selected attenuating material, under the pressure and temperature of the predetermined operating conditions, and then measuring the highest pressure (Pmax(1)) reached in the test sphere filled with the first selected attenuating material, after ignition. Of course, the step of empirically determining a second peak deflagration pressure (Pmax(2)) may be performed by igniting combustible gas in the test sphere, after filling it with the second selected attenuating material, under the pressure and temperature of the predetermined operating conditions, and then measuring the highest pressure (Pmax(2)) reached in the test sphere filled with the second selected attenuating material, after ignition. Maximum pressures (Pmax(n)) for additional (i.e., third, fourth, etc.) types and sizes of attenuating materials are determined by the same method as described hereinabove.

In another embodiment of the present invention a tubular reactor is provided which is adapted for attenuation of deflagration pressure resulting from combustion of combustible gas therein. The tubular reactor is of a generally conventional configuration, as described above in connection with FIG. 1, in that it comprises a plurality of tubes each extending between a first and a second perforated plate, all of which are enclosed in a shell. Enclosure of the tubes and perforated plates by the shell forms a shell-side region for circulation of fluid around the plurality of tubes, and a reaction-side region. The reaction side region comprises a defined inlet region, bounded on one side by the first perforated plate and having a radius substantially equal to the radius of the first perforated plate, and a defined outlet region bounded on one side by the second perforated plate and having a radius substantially equal to the radius of the second perforated plate. Each of the plurality of tubes is in fluid communication with both the defined inlet and defined outlet regions for throughput of reaction fluids. The tubular reactor in accordance with the present invention further comprising attenuating material having a plurality of components, all of which have a geometry and which are placed such that void spaces and open pathways between the components are minimized. The attenuating material occupies at least 20%, for example, at least 40%, or at least 60% or at least 80% of at least one of the defined inlet region and the defined outlet region. Moreover, the components of the attenuating material have an effective diameter (Ds(a)) which satisfies the following mathematical relationship:

$$Ds(a)=[DMF(a) \times R(v)]/40$$

wherein Ds(a) is in centimeters, (DMF(a)) is the deflagration mixing factor associated with the attenuating material and which is determined empirically by the above-described method, and R(v) in centimeters and is the radius of whichever defined inlet or outlet region is occupied by the attenuating material.

Where the tubular reactor is used for the gas phase catalytic oxidation of $C_1$-$C_8$ hydrocarbons, for example $C_3$-$C_8$ hydrocarbons, to produce their corresponding oxygenate products, including, but not limited to, unsaturated aldehydes and unsaturated carboxylic acids, combustible gas is present in the defined regions. The combustible gas is often a mixture of one or more $C_1$-$C_8$ hydrocarbons and oxygen, among other possible components, such as one or more oxygenate products and inert materials. Examples of gas phase catalytic oxidations include but are not limited to: oxidation of isobutylene to methacrolein or methacrylic acid; oxidation of isobutane to methacrolein or methacrylic acid; oxidation of butane to maleic anhydride; oxidation of propane to acrolein or acrylic acid; oxidation of propylene to acrolein or acrylic acid; and ammoxidation of methane to hydrogen cyanide.

As discussed hereinabove, the geometry of the attenuating material comprises at least one shape selected from the group consisting of: spherical, oval, cylindrical, saddle-shaped, block-shaped, elongated and polyhedral, and at least one characteristic selected from the group consisting of: solid, hollow, porous, and having at least one through passage. Furthermore, the attenuating material comprises at least one type of material selected from the group consisting of: ceramic, mineral, metal and polymer. Examples of suitable attenuating materials include but are not limited to: ceramic saddles, vermiculite particles, cylinders comprising rolled FIBERFRAX ceramic blanket (FIBERFRAX material is commercially available from Unifrax of Niagra Falls, N.Y., USA), glass marbles, spent mixed metal oxide type oxidation-catalyst, calcium carbonate particles, aluminum Raschig rings, pre-cast cylinders comprising bubble alumina, phenolic resin billiard balls, hollow stainless steel balls, reticulated copper foam tiles, Pentaring bed-topping media (commercially available from Saint-Gobain Norpro of Stow, Ohio, USA), and silicon carbide ball bearings.

In a further embodiment of the tubular reactor of the present invention, two or more attenuating materials are present in at least one of the defined inlet region and defined outlet region and at least one of the attenuating materials has components with a geometry different from the geometry of the components of the other attenuating material.

In particular, two or more attenuating materials may be present in at least one of the defined inlet region and defined outlet region. At least one of those attenuating material should have components with an effective diameter (Ds(a)) which satisfies the following mathematical relationship:

$$Ds(a) = [DMF(a) \times R(v)]/40$$

wherein Ds(a) is in centimeters, (DMF(a)) is the deflagration mixing factor associated with the attenuating material and which is determined empirically by the method described hereinabove, and R(v) is in centimeters and is the radius of whichever defined inlet or outlet region is occupied by the attenuating material.

The present invention also provides a method for performing gas phase reactions safely under flammable operating conditions, which comprise a gas feed composition, reaction temperature and reaction pressure.

Whether flammable operating conditions exist in any given reaction system will, of course, depend on a number of variables, including, but not limited to, the type of gas materials and their proportions contained in the gas feed composition, as well as the temperature and pressure at which the reaction(s) is/are performed (i.e., the reaction temperature and the reaction pressure). As is well understood by persons of ordinary skill in the relevant art, flammable operating conditions are those under which there is the potential for gaseous streams containing combustible gas, such as alkanes and alkenes, and oxygen, to ignite, combust, and/or explode when the relative concentrations, or ratios, of combustible gas and oxygen in the same gaseous stream fall within the explosive region between the Upper Explosive Limit (UEL) and the Lower Explosive Limit (LEL), such limits depending upon the particular constituents of the feed streams, the temperature, and the pressure at which they exist in the processes. In order to avoid such mishaps, the relative amounts of combustible gas (alkanes, alkenes) and oxygen in the gaseous feed streams of such oxidation processes are typically maintained at values outside of the explosive region, for example at ratios below the LEL or, alternatively, above the UEL. This approach, however, limits the amount of reactant throughput that can be employed during reaction and, therefore, also limits the quantity of product that can be produced, depending upon the temperature and pressure required for the particular reaction of concern to proceed at an economically viable rate. Persons of ordinary skill in the art are well-acquainted with the various methods of determining whether flammable operating conditions exist for a particular gas feed composition, which comprises hydrocarbons and oxygen, under particular reaction temperature and pressure. For example, without limitation, one way to determine flammability of a particular reaction system is to perform laboratory measurements as described in European Standard DIN EN 1839: January 2004.

The method of the present invention for performing gas phase reactions safely under flammable operating conditions involves providing a reaction vessel which has a defined region through which the gas feed composition passes and the defined region is at least 20% by volume occupied by at least one attenuating material which maintains its physical shape under the flammable operating conditions. This method of performing gas phase reactions further involves providing one or more gaseous materials to the reaction vessel to form the gaseous feed composition which passes through the reaction vessel's defined region and subjecting the gaseous feed composition to one or more reactions in the reaction vessel, at a temperature and pressure under which said gaseous feed composition is flammable.

The one or more gaseous materials comprise a hydrocarbon, an oxygen-containing gas and, optionally, one or more inert materials. "Hydrocarbons" include, for example, without limitation, alkanes such as methane, propane and butane, and alkenes such as propylene and iso-butylene, as well as more complex hydrocarbon compounds. The term "oxygen-containing gas," as used herein, means any gas comprising from 0.01% up to 100% oxygen or oxygen-containing compounds, including for example, without limitation: air, oxygen-enriched air, nitrous oxide, nitrogen dioxide, pure oxygen, mixtures of pure oxygen or oxygen-containing compounds with at least one inert gas, such as nitrogen, and mixtures thereof. Although the oxygen containing gas may be pure oxygen gas, it is usually more economical to use an oxygen containing gas, such as air, when purity is not particularly required. Also, "inert" materials include any material which is substantially inert, i.e., does not participate in, is unaffected by, and/or is inactive, in the particular reaction of concern and, for example, may include, but are not limited to: nitrogen, steam, noble gases and carbon dioxide.

The attenuating material may be selected according to the method of the present invention described hereinabove which involves performing experimental tests to determine the maximum suitable effective diameter of the components of the attenuating material. The attenuating material may be any type of material selected from the group consisting of: ceramic, mineral, metal and polymer. The components of the attenuating material each has a geometry comprising at least one shape selected from the group consisting of: spherical, oval, cylindrical, wire, saddle-shaped, block-shaped, elongated and polyhedral, and at least one characteristic selected from the group consisting of: solid, hollow, porous, and having at least one through passage.

In one embodiment of the method for performing gas phase reactions safely under flammable operating conditions, the hydrocarbon comprises propylene, the gas phase reactions comprise oxidation of the propylene. In this embodiment, the attenuating materials, may for example, comprise crimped wire mesh cylinders and crimped wire mesh polyhedrons. In another embodiment, the gaseous materials further comprise ammonia, the hydrocarbon comprises methane, and the gas phase reactions comprise ammoxidation of the methane. The attenuating materials used in the reactor for ammoxidation of methane may suitably comprise ceramic foam polyhedrons.

EXAMPLES

Example 1

A pressure vessel of volume 141 ft$^3$ (4 m$^3$), equipped with an ignition source and various temperature and pressure measuring sensors and devices, was used to test the maximum deflagration pressure reached by combustible gas ignited in the pressure vessel, both in the absence and in the presence of different attenuating materials.

First, the empty pressure vessel was filled with combustible gas, having the composition of 4 vol % propylene, 11 vol % nitrogen and 85 vol % air, based on the total volume of the combustible gas, and ignited, and the actual maximum deflagration pressure reached was measured.

After evacuation, the pressure vessel was filled with stainless steel Pall rings of 2-inch (5.1 cm) diameter, achieving a surface area of 35 ft$^2$/ft$^3$ (1.15 cm$^2$/cm$^3$), and then again filled with the aforesaid combustible gas, which was ignited and pressure measurements taken. The same procedure was performed with 1-inch (2.54 cm) stainless steel Pall rings, achieving a surface area of 65 ft$^2$/ft$^3$ (2.13 cm$^2$/cm$^3$), and then with ⅝-inch (1.6 cm) stainless steel Pall rings, achieving a surface area of 110 ft$^2$/ft$^3$ (3.61 cm$^2$/cm$^3$), and then with sheets of crimped stainless steel knit mesh (constructed of 0.0105-inch (0.2667 mm) diameter wire which was crimped and rolled to achieve a density of 288 kilograms/cubic meter (18 pounds/cubic foot), and is commercially available from Koch-Otto York Separations Technology of Wichita, Kans.) which were placed in the defined region layer upon layer until the defined region was filled, achieving a surface area of 97 ft$^2$/ft$^3$ (3.18 cm$^2$/cm$^3$). The maximum deflagration pressure achieved using each of the aforesaid attenuating materials, as compared to the total surface area and the maximum pressures achieved in the other tests are provided below in Table 1.

TABLE 1

| Type of Packing | Volume Packed in Vessel (ft$^3$) | Total Surface Area (ft$^2$) | Initial Temp (° C.) | Initial Pressure (psig) | Actual P(max) (psig) |
|---|---|---|---|---|---|
| none | | | 44 | 23 | 290 |
| 2-inch Pall rings | 120 | 4200 | 25 | 23 | 400 |
| 1-inch Pall rings | 110 | 7150 | 53 | 25 | 45 |
| ⅝-inch Pall rings | 110 | 12100 | 157 | 25 | 58 |
| ⅝-inch Pall rings | 110 | 12100 | 148 | 25 | 65 |
| Crimped Wire mesh | 140 | 13580 | 158 | 25 | 44 |
| Crimped Wire mesh | 140 | 13580 | 156 | 25 | 44 |

From the data in Table 1, it will be obvious that none of the tested materials successfully prevented combustion because, if combustion had been successfully prevented, there would have been no appreciable pressure increase in the test vessel (i.e., initial pressure=Pmax) following ignition. Additionally, given that all attenuating materials that were tested were of the same material of construction (stainless steel), and therefore had the same thermal conductivity, it would be expected based upon the teachings of the art of flame arrestor design that, if heat removal were in fact the controlling mechanism within this test system, there should be a very strong correlation between total surface area and Pmax. However, it is evident from the data in Table 1 that there is no consistent correlation between total surface area and Pmax. Both one inch Pall rings, with a total surface area of 7150 ft$^2$, and crimped wire mesh, with a total surface area of 13580 ft$^2$, achieved a lower Pmax value than ⅝ inch Pall rings, with an intermediate total surface area of 12100 ft$^2$. Further, 2 inch Pall rings, with a total surface area of 4200 ft$^2$, achieved a Pmax value that significantly exceeded that of the empty vessel (no surface area). Despite the prior art teachings, these surprising test results suggest that some other, heretofore unidentified mechanism is at work in combustible gas systems.

Example 2

FIGS. 6 and 7A-7D have been provided to facilitate understanding of the following example of the method and a tubular reactor in accordance with the present invention.

In order to achieve acrylic acid manufacture at increased production rates, a commercial scale, high-productivity propylene oxidation shell and tube (tubular) reactor (not shown per se) was configured for safe operation with a flammable, high hydrocarbon feed gas comprising greater than 7% propylene at a pressure of 2.55 bar (37 psia) and a temperature of 207° C. (405° F.). Such high productivity operation has heretofore been unattainable, as the widely known prior art (see for example U.S. Pat. No. 7,074,955, U.S. Pat. No. 7,102,030, and U.S. Pat. No. 7,326,810, as well as US Patent Application Publication Nos. US2006/0111575 and US2006/0166365), teaches that operation under the conditions of flammable or even near-flammable feed composition is to be avoided. After implementation of the method and apparatus of the present invention, however, this valuable mode of operation may now be utilized for the safe operation of high productivity oxidation processes, such as for example the manufacture of acrolein and acrylic acid.

The shell and tube reactor of this example comprised over 25,000 tubes welded to a 6750 millimeter (22 feet) diameter horizontal inlet tube sheet (not shown per se, but refer generally to FIG. 1 and the accompanying description). The shell and tube reactor was configured as a single reactor shell, which means that multiple reaction zones, having different catalyst compositions, were present within the single vessel, each tube having multiple reaction zones and sub-zones for optimal reaction conditions.

The headspace (i.e., the defined inlet region) of this upflow shell and tube reactor (meaning the defined inlet region is located at the "bottom" of the reactor, i.e., defined region 22 in FIG. 1) was filled with attenuating material comprising pressure attenuating components which attenuate deflagration pressure in accordance with the method of the present invention. To accomplish this result, the attenuating material comprised a variety of wire mesh components which were manually positioned within the reactor head to minimize axial flow pathways (e.g., to prevent channeling). FIGS. 6 and 7A-7D generally illustrate the resulting configuration of wire mesh components for this embodiment, which is described in greater detail hereinafter.

The reactor, in accordance with the inventive embodiment of this example, was safely operated under the following feed conditions:

| | |
|---|---|
| Inlet Temperature | 207°C. |
| Inlet Pressure | 22 psig |
| % Propylene | 7.80 |
| % Propane | 0.50 |
| % N2 | 65.43 |
| % O2 | 14.62 |
| % H2O | 10.40 |
| % CO2 + CO | 0.50 |
| % Other - includes: acetic, formic, maleic, & acrylic acid; acetaldehyde; acetone; acrolein; formaldehyde; and argon | 0.75 |

Figure 6:
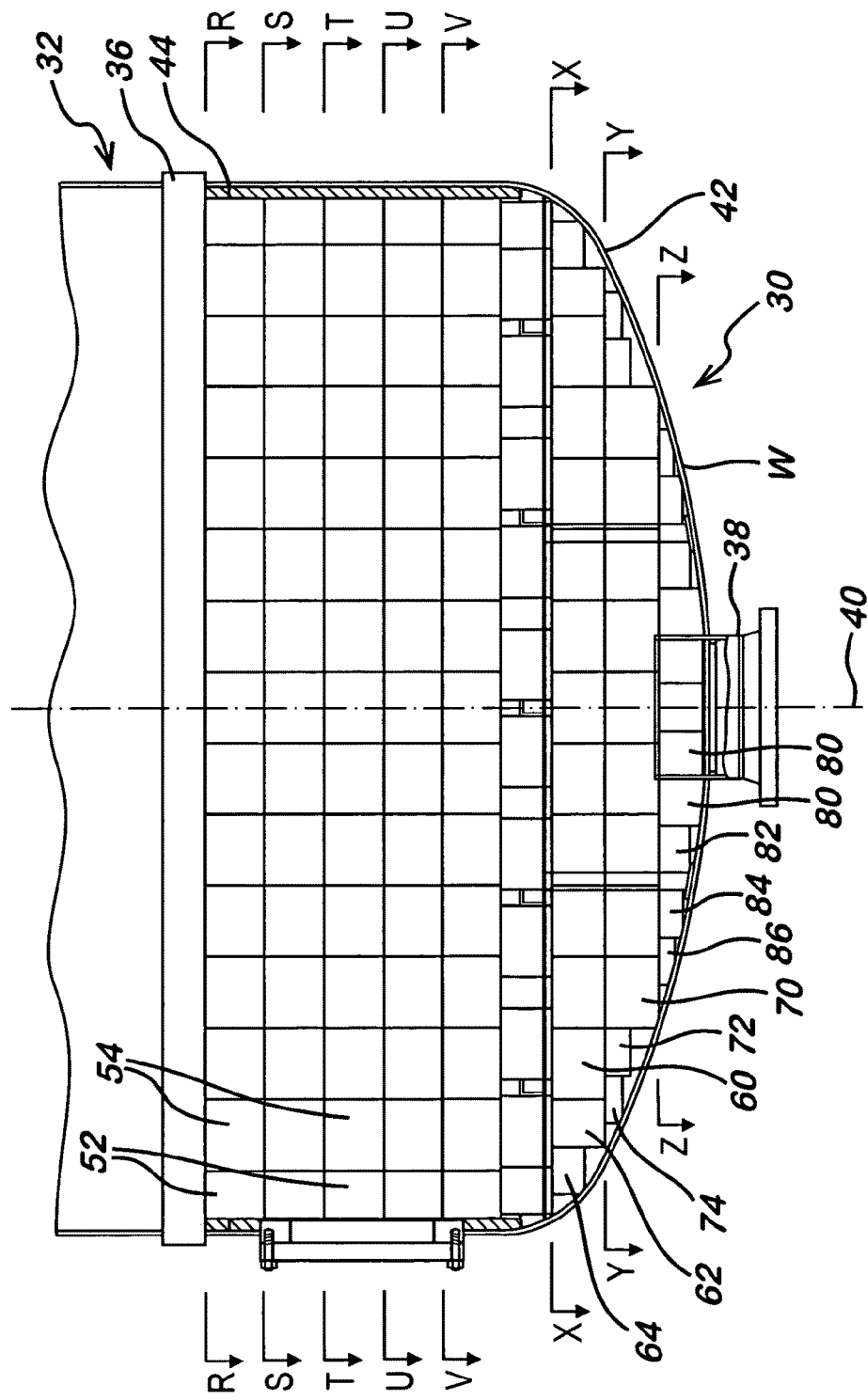
FIG. 6 is an elevational side view of a reactor inlet-head assembly connected to a tubular reactor, forming an enclosed headspace (defined inlet region) with the inlet tube sheet, showing the placement and position of the mesh components used for attenuating material therein.

With reference to FIG. 6, an elevational side view of the reactor inlet-head assembly 30 is shown, connected to the reactor 32 (only partially shown) so as to form an enclosed headspace (defined inlet region 34) with the inlet tube sheet 36. An inlet piping flange 38 is positioned on the centerline 40 of the inlet-head assembly 30 to allow feed gas (not shown per se) to enter the headspace (defined inlet region 34). The reactor inlet-head assembly 30 comprises a torispherical head 42 welded to an 1855 millimeter (6.1 feet) long, straight-wall channel section 44. The headspace dimensions of the reactor are, therefore, about 6750 millimeters (22 feet) in diameter and about 3125 millimeters (10.25 feet) tall overall as measured at the centerline 40 of the inlet-head assembly 30. The enclosed headspace 34 has a volume of 96.1 cubic meters (3393 cubic feet).

The specific wire mesh used to make the components of this embodiment was a knitted wire mesh, comprising 0.0105 inch diameter 304L Stainless Steel wire—commonly referred to as "bulk mesh"—which was crimped and rolled to achieve a density of 288 kilograms/cubic meter (18 pounds/cubic foot) and obtained from ACS Industries of Hartford, Conn. Suitable wire mesh can also be commercially obtained from Koch-Otto York Separations Technology of Wichita, Kans. or Metex Corporation of Edison, N.J. Typically, such wire mesh is constructed as a knitted tube and is then either flattened for use in a double-ply "blanket" form, or split for use in a single-ply sheet form.

In the present embodiment, a combination of wire mesh components, comprising cylinders and rectangular pads, were placed within the enclosed headspace 34. To form cylindrical wire mesh components ("rolls"), rectangular sections of two-ply wire mesh were first crimped and then coiled to form a cylinder of a specified final height and diameter, with a bulk density of about 288 kilograms/cubic meter (18 pounds/cubic foot), with a tolerance of +/−0.5 pound/cubic foot. To form rectangular pad wire mesh components ("blankets"), rectangular sections of two-ply wire mesh were first crimped and then layered to form a rectangular pad of a specified final length, width, and height, with a bulk density of about 288 kilograms/cubic meter (18 pounds/cubic foot).

Although crimping is optional, the use of crimping increases the void fraction of the wire mesh, providing a reduced bulk density for a lower installed total weight of components. In an alternative embodiment, uncrimped two-ply wire mesh may be used to form wire mesh rolls and wire mesh blankets with a bulk density of about 416 kilogram/cubic meter (26 pounds/cubic foot).

For the specific headspace volume of the present embodiment, described above, the following wire mesh components listed in Table 2 were used:

TABLE 2

| Dimensions of the specified component need for this embodiment ("OD" = outer diameter) | Total Number of components required to implement this embodiment |
|---|---|
| Coiled Cylinderical wire mesh | |
| 18 inches OD × 14.5 inches high | 710 rolls |
| 18 inches OD × 13 inches high | 300 rolls |
| 12 inches OD × 14.6 inches high | 452 rolls |
| 12 inches OD × 13 inches high | 192 rolls |
| 12 inches OD × 10 inches high | 18 rolls |
| 12 inches OD × 8 inches high | 87 rolls |
| 12 inches OD × 6 inches high | 69 rolls |
| 12 inches OD × 4 inches high | 88 rolls |
| 2.6 inches OD × 14.6 inches high | 1722 rolls |
| 2.6 inches OD × 13 inches high | 794 rolls |
| Layered Rectangular Pad wire mesh | |
| 14.6 inches × 12 inches × 3 inches | 355 blankets |
| 12 inches × 12 inches × 6 inches | 495 blankets |
| 73 inches × 24 inches × 3 inches | 40 blankets |

The above-listed wire mesh components were manually placed within the defined inlet region 34 in accordance with the layouts shown in FIGS. 7A-7D for each labeled elevational level. This resulted in an enclosed headspace (defined inlet region 34) that was essentially completely filled with attenuating material comprising wire mesh rolls and blankets where the upper-most wire mesh surface was positioned within a distance of between about 0 to 15 centimeters from the inlet tube sheet 36.

Figure 7A:
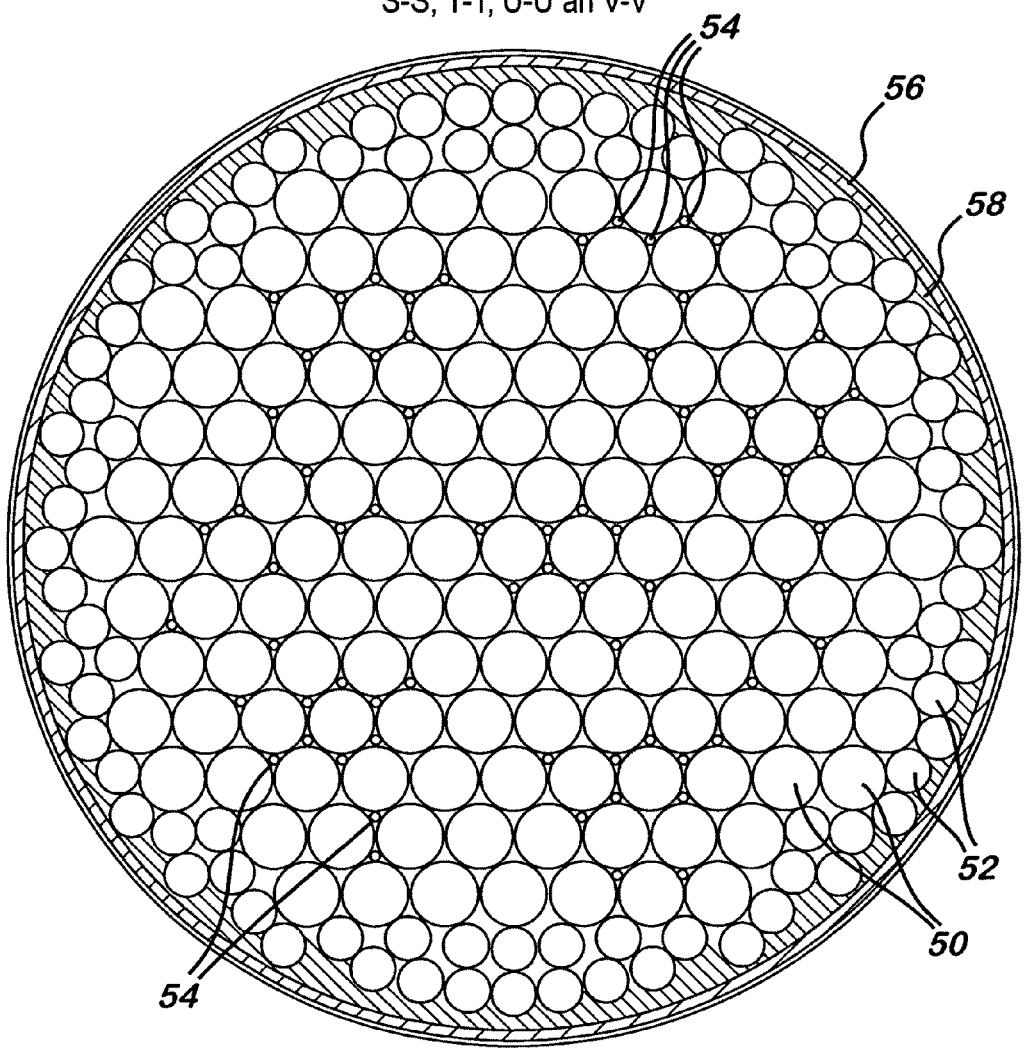
FIG. 7A is a cross-sectional top view of the reactor inlet assembly of FIG. 6, taken along lines R-R and looking in the direction of the arrows, showing the placement and position of the mesh components used for attenuating material therein, the cross-sectional top view taken along lines S-S, T-T, U-U and V-V are each the same as that shown in FIG. 7A.

The five levels within the defined inlet area 34 closest to the tube sheet, i.e., levels R-R, S-S, T-T, U-U and V-V (see FIG. 6), respectively, were packed similarly, as shown in FIG. 7A, since they were of the same geometry, particularly, the same diameter. With reference back to FIG. 7A, wire mesh rolls 50 that were 18 inches in diameter and 14.6 inches high were used to fill the majority of the headspace at these levels, while wire mesh rolls 52 sized 12 inches in diameter and 14.6 inches high were positioned around the perimeter of the plurality of larger wire mesh rolls 50. Also, wire mesh rolls 54 having 2.6 inches in diameter and being 14.6 inches high were positioned in void spaces between the largest wire mesh rolls 50 to fill at least some of the void spaces between those large wire mesh rolls 50. At each level (RR, SS, T-T, U-U and V-V), the wire mesh rolls of height 14.6 inches were stacked, end-to-end, on top of one another, in a staggered manner to break up the void channels that would otherwise be formed.

Wire mesh blankets 56 sized 3 inches thick, 73 inches high and 24 inches wide were compressed in a layer around the perimeter of the defined inlet region and cover the total height of levels R-R, S-S, T-T, U-U and V-V. Smaller wire mesh blankets 58 sized 3 inches thick, 14.6 inches high and 12 inches wide were inserted in the voids spaces between the larger wire mesh blankets 56 and the medium sized wire mesh rolls 52 around the perimeter.

Figure 7B:
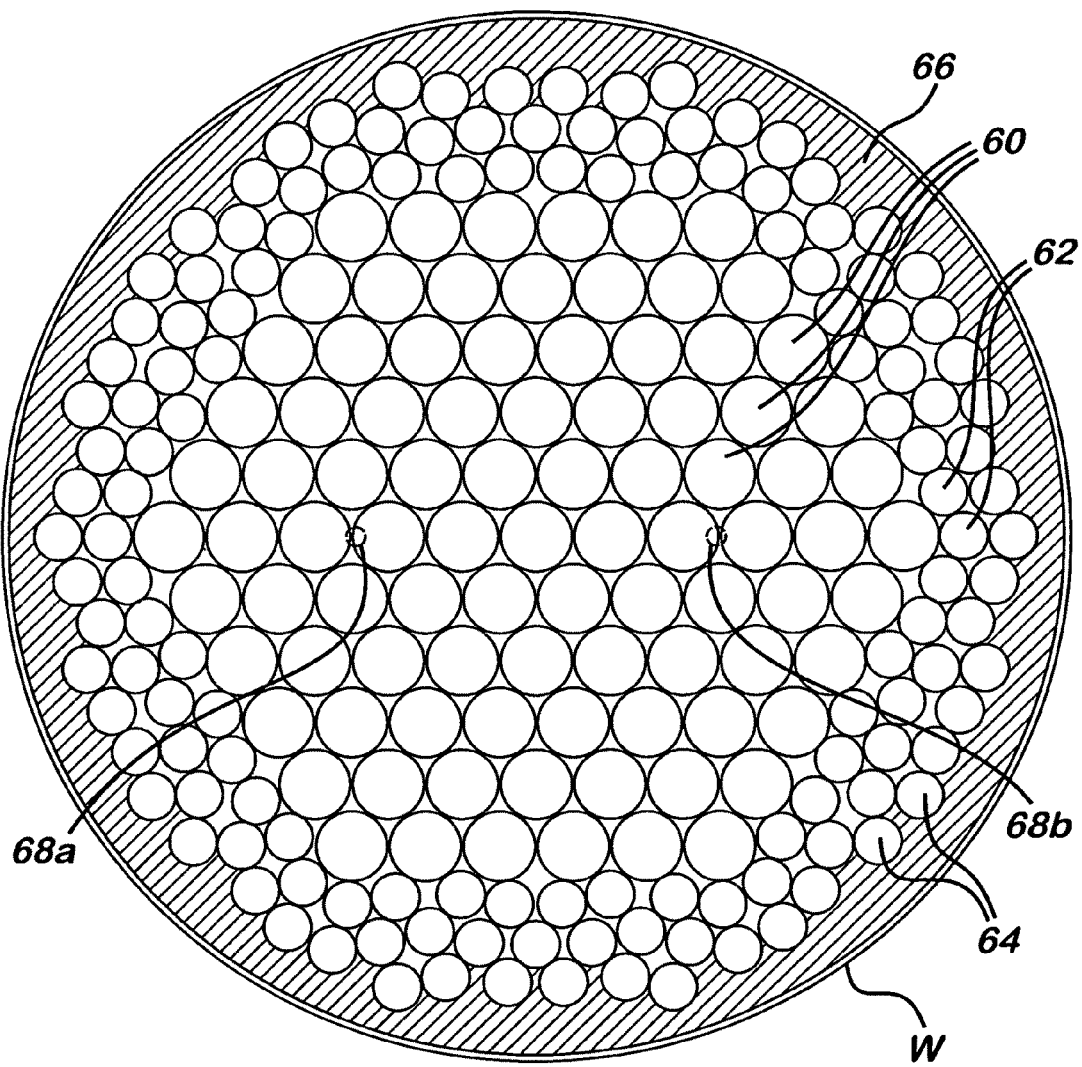
FIG. 7B is a cross-sectional top view of the reactor inlet assembly of FIG. 6, taken along lines X-X and looking in the direction of the arrows, showing the placement and positioned of the mesh components used for attenuating material therein.

FIG. 7B shows the configuration of wire mesh rolls and blankets at level X-X, which has a smaller diameter than the aforementioned five levels represented by FIG. 7A. In particular, a combination of wire mesh rolls and blankets was again employed with the largest rolls 60 on this level X-X being 18 inches in diameter and 13 inches high and being placed centrally so as to occupy the majority of the cross-sectional area of the level. Smaller wire mesh rolls 62, having 12 inches diameter, but the same height at 13 inches, were placed around the perimeter of the largest wire mesh rolls 60. Additional wire mesh rolls 64 having the same 12 inches diameter, but being even at 8 inches high, to accommodate the tapered wall of the headspace 34 (defined inlet region) at this height, were placed around the perimeter of the smaller wire mesh rolls 62. Finally, the outermost volume of level X-X, around the perimeter of the 8-inch tall wire mesh rolls 64 was filled with wire mesh blankets 66. As shown in FIG. 7B, where obstacles were encountered in the headspace 34, such as posts, baffles, nozzles, etc. (for example, see posts 68a, 68b in FIG. 7B), the wire mesh components (for example, the largest wire mesh rolls 60) may be trimmed, i.e., portions cut away, to accommodate such obstacles, as is readily understood by persons of ordinary skill in the art.

Figure 7C:
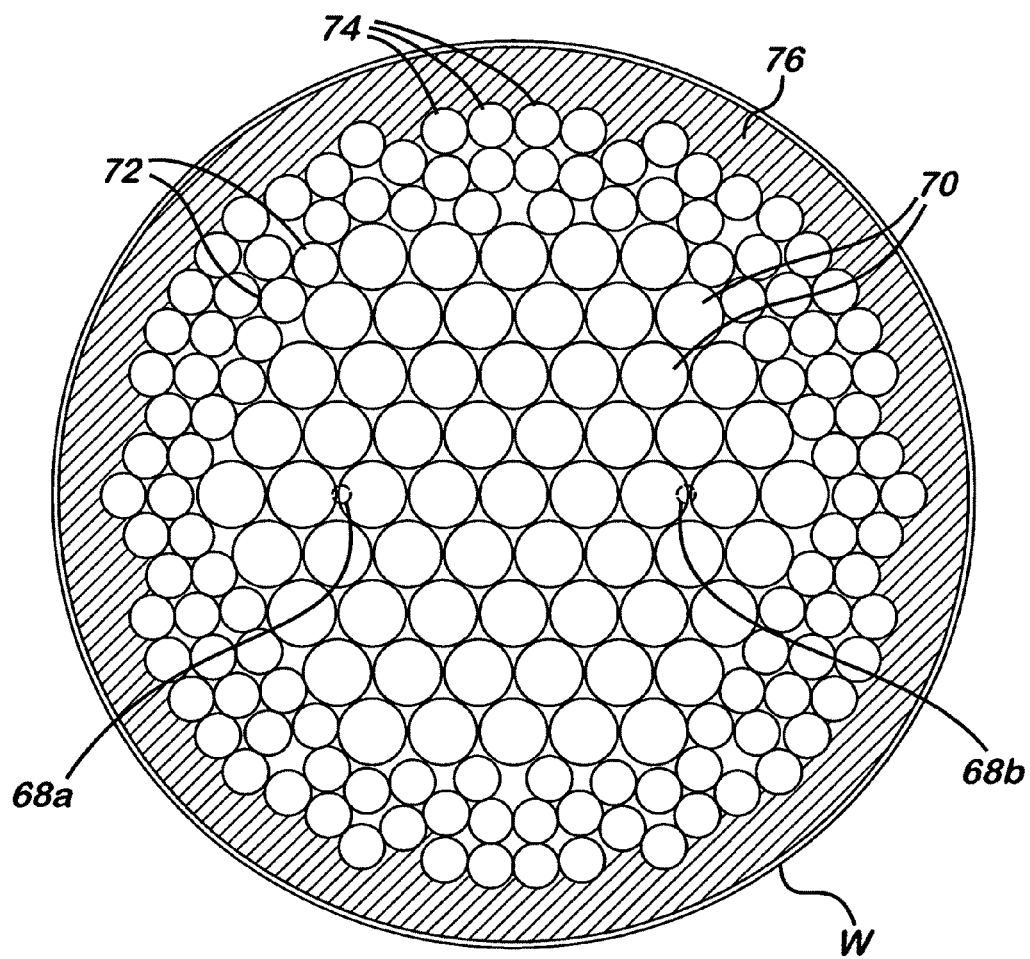
FIG. 7C is a cross-sectional top view of the reactor inlet assembly of FIG. 6, taken along lines Y-Y and looking in the direction of the arrows, showing the placement and positioned of the mesh components used for attenuating material therein.

FIG. 7C shows the configuration of wire mesh rolls and blankets at level Y-Y, which has a still smaller diameter than the aforementioned level X-X represented by FIG. 7B. Again, the largest wire mesh rolls 70 measure 18 inches in diameter and 13 inches in height and were placed centrally in the cross-sectional area of level Y-Y. Wire mesh rolls 72 having 12 inches diameter and only 6 inches in height were placed around the perimeter of the largest wire mesh rolls 70, and even shorter wire mesh rolls 74, which also have 12-inch diameter, but were only 4 inches in height, were placed around the perimeter of the 6-inch-high wire mesh rolls 72. Wire mesh blankets 76 were used to fill the remaining space between the 4-inch-high wire mesh rolls 74 and the vessel wall W. As can be seen in FIG. 8C, the posts 68a and 68b extend downward from level X-X and into level Y-Y, so that at least a few of the 12-inch-high wire mesh rolls 72 were trimmed as in the previous level.

Figure 7D:
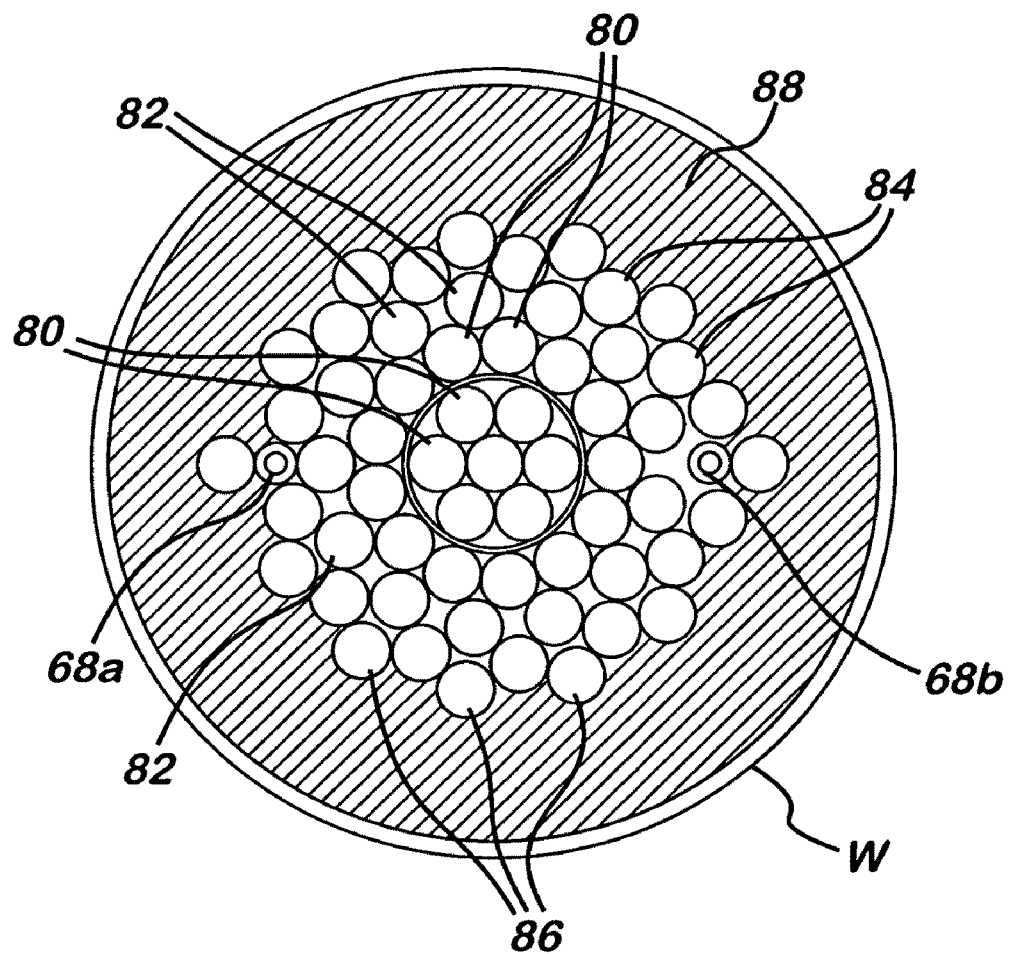
FIG. 7D is a cross-sectional top view of the reactor inlet assembly of FIG. 6, taken along lines Z-Z and looking in the direction of the arrows, showing the placement and positioned of the mesh components used for attenuating material therein.

FIG. 7D shows the configuration of wire mesh rolls and blankets at level Z-Z, which has a still smaller diameter than the aforementioned level Y-Y represented by FIG. 7C. As shown, wire mesh rolls of different heights, but all having 12-inch diameters, were used to fill level Z-Z. More particularly, the tallest wire mesh rolls 80 used in level Z-Z were 11 in height, and the next tallest wire mesh rolls 82, which were placed around the perimeter of the tallest rolls 80, have a height of 8 inches. Wire mesh rolls 84 that were 6 inches high (still with 12-inch diameters) were placed about the perimeter of the 11-inch-high wire mesh rolls 82, and still shorter wire mesh rolls 86, having a height of only 4 inches, were placed around the perimeter of the 6-inch-high wire mesh rolls 84. As in every other level, wire mesh blankets 88 were placed around the perimeter of the outermost wire mesh rolls 86 to fill the remaining space to the vessel wall W.

Placing the highest (i.e., tallest) wire mesh rolls in the centermost portions of each level, surrounded by shorter wire mesh rolls enabled the wire mesh attenuating material to fill as much of the headspace 34 as possible, as the vessel walls taper at the bottom-most portion of the headspace 34 (defined inlet region).

In alternative embodiments, the wire diameter of one or more components of attenuating materials may be varied—for example, a wire diameter of 0.008 inch, or of 0.011 inch may be used—and the wire mesh size of the knit for one or more components may be varied—for example, 30 needle mesh, or 90 needle mesh, may be used—without deviating from the spirit of the inventive method. Such changes, in combination with optional crimping, may be made to optimize variables such as cost, ease of handling, bulk density, and durability and are within the ability of one of ordinary skill in the art, given the benefit of the present disclosure.

Additionally, alternative materials of construction may be used to form the wires used in making the wire mesh. In one embodiment, for example, the wire mesh may comprise copper to resist polymeric fouling by components that may be present in recycled gases. In another embodiment, the wire mesh may comprise magnetic stainless steel. In still another embodiment, the mesh is formed from knit ceramic fibers comprising one or more materials selected from silica, alumina, and zirconia.

It is noted that, although the foregoing example is provided in connection with a single reactor shell configuration, persons of ordinary skill in the relevant art will recognize that where the process vessel comprises multiple shell and tube reactors arranged in tandem, with or without intermediate cooling exchangers, each reactor containing a catalyst composition for facilitating one or more chemical reactions, with or without sub-zones, the attenuating material may be placed in one or more of: the defined outlet region of an upstream shell and tube reactor, the optional intermediate heat exchangers, and the inlet of the subsequent downstream shell and tube reactor. Such embodiments are beneficial because the outlet gas composition of the upstream reactor may comprise one or more compounds capable of forming a combustible gas mixture in subsequent downstream process vessels. Such configurations are especially preferred in cases where supplemental oxidant (e.g., air or other mixtures comprising oxygen) additions are made at one or more points intermediate to two reactors in tandem.

Furthermore, although the foregoing example concerns a process vessel used for catalytic oxidation, the method and apparatus of the present invention are equally and beneficially applicable to process vessels configured to perform other types of chemical reactions, such as, for example, ammoxidation of methane in an Adrussow hydrogen cyanide reactor. For example, such a cyanide-producing reaction vessel may have a conical-shaped headspace ("defined inlet region") which is at least 50% filled with reticulated ceramic foam. Deflagration attenuation in accordance with the method of the present invention is particularly beneficial when hydrogen cyanide reactors are operated under flammable feed conditions; such conditions may occur, for example, when the reactor is operated at greater than atmospheric pressure (e.g., pressures of 30 psig or more), or when the reactor is operated with oxygen-enriched feeds. Due to the especially energetic pressure rises that may occur upon combustion of combustible gas feed within oxygen-enriched hydrogen cyanide reactors, it is especially preferred to employ the method of the present invention to hydrogen cyanide reactors wherein the ratio of oxygen to nitrogen in the feed gas, as measured in the region immediately upstream of the catalyst, is greater than about 25:75, for example, greater than about 30:70, or even greater than about 50:50.

Example 3

It is desired to utilize an exiting process vessel in combustible gas service in accordance with the method of the present invention. The process vessel was a shell and tube (i.e., tubular) type oxidation reactor, similar to the reactor of FIG. 1, and was operated in a downflow configuration, with combustible gas entering the top head of the vessel at an operating pressure of 3.42 bar (35 psig) and an operating temperature of 225° C. The existing reactor was not fitted with emergency pressure relief devices, such as rupture disks, and so must be capable of containing the pressure increase from any deflagration events. The inlet head of the vessel had an internal diameter of 675 cm (22 feet) and sufficient wall thickness to provide a maximum allowable containment pressure, P(c), of 12 bar (160 psig) under these operating conditions. The combustible gas composition in the defined region of the inlet reactor head was 5.5 vol % propylene, 19.5% oxygen, 73.3% nitrogen, and 1.7% water.

In accordance with the method of the present invention, deflagration pressure in the reactor inlet head may be attenuated by completely filling the defined region of the reactor inlet head with 90 mm hollow alumina spheres (commercially available from DeepSea Power & Light of San Diego, Calif. USA). Although these spheres are fabricated from 99.9% alumina, they have a bulk density less than that of water, beneficially minimizing the total weight of attenuating material that the reactor must support.

The object was therefore to determine whether such 90 mm hollow alumina spheres will provide sufficient pressure attenuation when placed within the inlet head such that the existing vessel may be safely operated under the intended conditions. Because of the physical size of the 90 mm hollow alumina spheres (actual diameter=9.14 cm (3.6 inches)), however, they could not be directly evaluated in the available 10 liter explosion-test apparatus.

In accordance with the method of the present invention, several attenuating materials having small-scale components were first evaluated in the laboratory-scale test apparatus to assess their capability for pressure attenuation in the example system. For the case of this specific example, tests were performed with 6 mm solid ceramic spheres, 6 mm×10 mm solid ceramic cylinders, and 20 ppi ceramic foam. For all Pmax determinations in this example, a 10-liter adiabatic explosion-test apparatus, designed in accordance with the requirements for European Standards DIN EN 13673-1 and DIN EN 13673-2, September 2003, was used. In particular, the apparatus included a 10 liter insulated test sphere with an internal radius of 13.4 cm (5.3 inches). The sphere was fitted with a fast-acting pressure transducer (model HEM-375-™, manufactured by Kulite Semiconductor Products of New Jersey, USA), as well as two thermocouples, and an electric ignition source.

In all but the empty vessel test (Test A), a 9 cm diameter by 9 cm long cylindrical wire-screen cage was also placed around the ignition source inside the test sphere; this cage ensured that sufficient free-space (about 0.57 liter) was maintained around the igniter so that self-sustaining combustion could be initiated.

A test gas composition matching the intended combustible gas composition of 5.5 vol % propylene, 19.5% oxygen, 73.3% nitrogen, and 1.7% water was prepared by mixing pure component gases in a heated premixing vessel. This test gas composition was used for all Pmax determinations in this example.

Test A: Empty Vessel

The empty test vessel (containing no attenuating material) was first evacuated (<1 mbar pressure). The premixed test gas mixture was then introduced into the vessel to achieve an internal gas pressure of 3.4 bar (35 psig) and an initial temperature of 225° C. In accordance with the requirements of the aforementioned European standards, the gas was then ignited and the pressures and temperatures monitored to obtain a measurement of Pmax for the resulting deflagration in the empty test vessel.

Test B: Solid Ceramic Spheres

Approximately 14 kg of 6 mm (quarter-inch) diameter DENSTONE 57 support spheres (commercially available from Norton Chemical Products Corp. of Akron, Ohio, USA) were poured into the same test vessel and allowed to self-assemble (no manual adjustments were made to the packing density). This represented a 94% volume-fill of ceramic spheres (9.43 liters of spheres+0.57 liters of space within the wire-screen cage). As in the previous case, the vessel was next evacuated and then charged with test gas to achieve an internal gas pressure of 3.4 bar (35 psig) and an initial temperature of 225° C. The gas was then ignited to obtain a measurement of Pmax of the resulting deflagration in the test vessel with ceramic spheres. The effective diameter, Ds, of these ceramic spheres is determined to be 0.64 cm (¼"). The deflagration mixing factor (DMF) for these ceramic spheres is determined by the formula: DMF=Ds/Rts×40, wherein Rts, the radius of the test vessel sphere, is 13.4 cm. Thus, the DMF for these ceramic spheres is calculated to be 1.91

Test C: Solid Ceramic Cylinders

Figure 10:
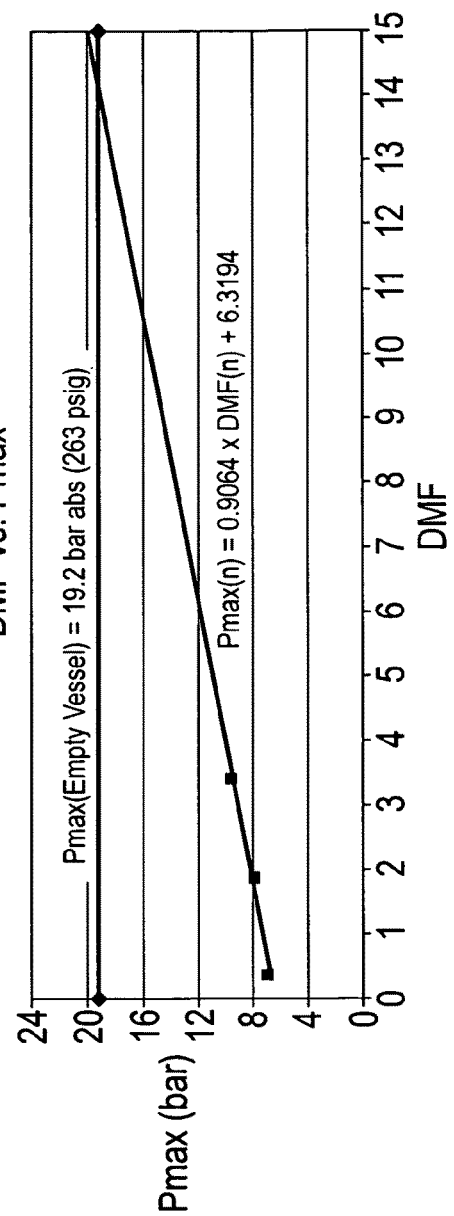
FIG. 10 is a plot demonstrating the linearization of empirical data, i.e., deflagration mixing factor (DMF) vs. maximum deflagration pressure (Pmax), derived from experiments conducted with attenuating material comprising hollow alumina spheres and calculations in accordance with the present invention.

Approximately 13 kg of 6 mm (¼") diameter, 10 mm (⅜") long DENSTONE 57 Pellets (commercially available from Norton Chemical Products Corp. of Akron, Ohio, USA) were poured into the same test vessel and allowed to self-assemble (no manual adjustments were made to the packing density). This represented a 94% volume-fill of ceramic cylinder-shaped pellets (9.43 liters of cylinders+0.57 liters of space within the wire-screen cage). Again, the vessel was evacuated and then charged with test gas to achieve an internal gas pressure of 3.4 bar (35 psig) and an initial temperature of 225° C. The gas was then ignited to obtain a measurement of Pmax of the resulting deflagration event in the test vessel with ceramic cylinders. The effective diameter, Ds, of these ceramic cylinders can be determined mathematically by considering a two-dimensional projection of the cylinder inscribed within a sphere. More particularly, as seen in FIG. 10, the cylinder is represented by a rectangle of height Hc and width Dc (equal to the diameter of the cylinder). It is readily apparent from the figure that the diagonal of the inscribed rectangle is equivalent to the diameter, Ds, of the circumscribed circle. Thus, with Hc=0.9525 cm (⅜ inch), and Dc=0.635 cm (¼ inch), the effective diameter Ds may easily be determined to be 1.14 cm (⁷⁄₁₆ inch) and the DMF for these ceramic cylinders may then be calculated to be 3.42

Test D: 20 ppi Ceramic Foam 5 cm (2 inch) thick×15 cm diameter (6 inch) disks of 20 pores-per-inch (20 ppi) ALUCEL-LT alumina ceramic foam (commercially available from Vesuvius Hi-Tech Ceramics of Alfred, N.Y., USA) were manually placed in a multi-layer stack within the same test vessel. Some of the foam disks were broken into ten-piece fragments and these fragments were then fit into the test vessel adjacent the whole disks in order to minimize void space within the test sphere. This procedure resulted in approximately a 94% volume-fill of ceramic foam (9.43 liters of foam pieces+0.57 liters of space within the wire-screen cage). The resulting total quantity of ceramic foam within the test vessel weighed approximately 4 kg. As before, the vessel was evacuated and then charged with test gas to achieve an internal gas pressure of 3.4 bar (35 psig) and an initial temperature of 225° C. The gas was then ignited to obtain a measurement of Pmax of the resulting deflagration event in the test vessel with ceramic foam. The effective diameter, Ds, of the ceramic foam can be determined easily by simply converting the pores-per-inch (ppi) measure to centimeters. Thus, Ds for this ceramic foam is 0.127 cm (=¹⁄₂₀ inch); the DMF for this ceramic foam may then be calculated to be 0.38

The results of these tests are summarized in Table 3 below:

TABLE 3

| Component | Shape/Geometry | Ds, (cm) | DMF | Pmax (bar) | (psig) |
|---|---|---|---|---|---|
| A Empty Vessel | — | — | 0.00 | 19.2 | 263.3 |
| B Ceramic Sphere | 6 mm diameter | 0.64 | 1.90 | 7.8 | 98.0 |

TABLE 3-continued

| Component | Shape/Geometry | Ds, (cm) | DMF | Pmax (bar) | Pmax (psig) |
|---|---|---|---|---|---|
| C Ceramic Cylinder | 10 mm long × 6 mm dia. | 1.14 | 3.42 | 9.6 | 124.0 |
| D Ceramic Foam | 20 ppi | 0.127 | 0.38 | 6.8 | 83.9 |

From the test results, it will be evident to one of ordinary skill with the benefit of this disclosure that all three of the tested components would provide sufficient pressure attenuation in the example system to allow for safe operation. However, it is desired to know whether the 90 mm hollow alumina spheres can be used for this purpose. Therefore, to answer the question posed in this example, the mathematical relationship between Pmax and DMF is determined to be: Pmax(n)= 0.9064×DMF(n)+6.3194. One of ordinary skill in mathematics will recognize this to be a linear relationship between Pmax and DMF.

This relationship is shown as a diagonal trend line in FIG. 10. The DMF vs. Pmax data for tests B, C, and D, are also shown in FIG. 10. For convenience, Pmax for the empty vessel is also indicated in FIG. 10 by a horizontal line at 19.2 bar. Although not strictly required, the visual check provided by plotting the data and trendlines is recommended as it provides additional assurance that there are no serious errors or departures from ideal behavior within the dataset.

From FIG. 10, it will immediately be evident that, with respect to the specific test system of this example, any attenuating materials selected for use in accordance with the method of the present invention must have a DMF of less than about 14 inches in order to provide any measurable attenuation of Pmax in the example system.

Additionally, it can be determined (visually from FIG. 10, or mathematically from the linear relationship) that attenuating materials with a DMF value of about 6 or less are required in order to attenuate the deflagration pressure (Pmax) to a level equal to or less than the maximum containment pressure (P(c)) of the reactor vessel. Finally, in accordance with the method of the present invention, the DMF for the 90 mm hollow alumina spheres was determined next. In this case, the calculation of DMF was based upon the formula: DMF=Ds/Rpv×40, wherein Ds was the diameter of the hollow spheres (=9.14 cm) and Rpv was the radius of the process vessel (reactor inlet head radius=337.5 cm). From this, the hollow sphere DMF was determined to be 1.08 and it was concluded that completely filling the defined region of the reactor inlet head with 90 mm hollow alumina spheres would provide sufficient pressure attenuation to safely operate the reactor under the intended conditions.

Comparative Example 1

The previous example illustrated the benefit of completely filling a process vessel with pressure attenuating components (the "100% volume-fill" condition). In some situations, however, it may be desirable to instead utilize the inventive concept of the present invention with less than 100% volume-fill within a process vessel—for example to minimize the cost of purchasing attenuating material or minimize installation time.

The previously described 10-liter adiabatic explosion-test apparatus, was again utilized for all Pmax determinations in this example. As previously described a cylindrical wire-screen cage was placed around the ignition source inside the test sphere.

In these experiments, however, the internal volume of the cylindrical wire-screen cage was varied as a means to adjust the volume of pressure attenuating material within the test vessel. Three sizes of wire-screen cage were used: 0.28-liter, 0.57-liter, and 2.4-liter.

Again, the test gas composition of 5.5 vol % propylene, 19.5% oxygen, 73.3% nitrogen, and 1.7% water was prepared by mixing pure component gases in a heated premixing vessel. This test gas composition was used for all Pmax determinations in this example.

Test E:

The test vessel igniter was fitted with a 2.4 liter wire-screen cage. Approximately 10.7 kg of 6 mm (¼") diameter DENSTONE 57 Support Spheres (commercially available from Norton Chemical Products Corp. of Akron, Ohio, USA) were poured into the test vessel and allowed to self-assemble (no manual adjustments were made to the packing density). This represented a 76% volume-fill of ceramic spheres (7.6 liters of spheres+2.4 liters of space within the wire-screen cage). As in the previous case, the vessel was next evacuated and then charged with test gas to achieve an internal gas pressure of 3.4 bar (35 psig) and an initial temperature of 225° C. The gas was then ignited to obtain a measurement of Pmax of the resulting deflagration event in the test vessel with ceramic spheres.

Test F:

The test vessel igniter was fitted with a 0.57 liter (9 cm diameter by 9 cm long) wire-screen cage. Approximately 13.4 kg of 6 mm (¼-inch) diameter DENSTONE 57 Support Spheres (commercially available from Norton Chemical Products Corp. of Akron, Ohio, USA) were poured into the same test vessel and allowed to self-assemble (no manual adjustments were made to the packing density). This represented a 94% volume-fill of ceramic spheres (9.43 liters of spheres+0.57 liters of space within the wire-screen cage). As in the previous case, the vessel was next evacuated and then charged with test gas to achieve an internal gas pressure of 3.4 bar (35 psig) and an initial temperature of 225° C. The gas was then ignited to obtain a measurement of Pmax of the resulting deflagration event in the test vessel with ceramic spheres.

Test G:

The test vessel igniter was fitted with a 0.28 liter (9 cm diameter by 4.5 cm long) wire-screen cage. Approximately 14 kg of 6 mm (¼-inch) diameter DENSTONE 57 Support Spheres (commercially available from Norton Chemical Products Corp. of Akron, Ohio, USA) were poured into the same test vessel and allowed to self-assemble (no manual adjustments were made to the packing density). This represented a 97% volume-fill of ceramic spheres (9.72 liters of spheres+0.28 liters of space within the wire-screen cage). As in the previous case, the vessel was next evacuated and then charged with test gas to achieve an internal gas pressure of 3.4 bar (35 psig) and an initial temperature of 225° C. The gas was then ignited to obtain a measurement of Pmax of the resulting deflagration event in the test vessel with ceramic spheres.

The results of these tests are summarized in Table 4 below:

TABLE 4

| Component | Void Volume (liters) | % Volume-Fill | Pmax (bar) | Pmax (psig) |
|---|---|---|---|---|
| A Empty Vessel | 10 | 0% | 19.2 | 263.3 |
| E 6 mm Ceramic Sphere | 2.4 | 76% | 10.5 | 138.0 |
| F 6 mm Ceramic Sphere | 0.57 | 94% | 7.8 | 98.0 |
| G 6 mm Ceramic Sphere | 0.28 | 97% | 7.0 | 86.1 |

This data shows that for attenuating materials with components having the same geometry and the same effective diameter (Ds), greater pressure attenuation can be achieved with increasing volume-fill. The mathematical relationship between these data points was determined to be: Pmax(n)=−0.1214×% VF(n)+19.2, wherein % VF represents the % volume-fill of attenuating materials used. One of ordinary skill in mathematics will recognize this to be a linear relationship between Pmax and % VF.

Using this relationship, a 50% volume-fill of attenuating materials can then be predicted to reduce Pmax to about 13.1 bar (175 psig), representing a reduction in deflagration pressure of about 30% (=6.1/19.2). Further, a 35% volume-fill of attenuating materials can be predicted to reduce Pmax to about 15 bar (200 psig), representing a reduction in deflagration pressure of about 20% (=4.2/19.2). Additionally, a 20% volume-fill of attenuating materials can be predicted to reduce Pmax to about 16.8 bar (229 psig), representing a reduction in deflagration pressure of only about 10% (=2.4/19.2).

This relatively small reduction in Pmax at low % volume-fill and the potential uncertainty in extrapolating the linear relationship away from the actual measured values suggests that greater than 20% volume-fill of attenuating materials should be used when implementing the inventive method. For example, at least a 35% volume-fill of attenuating materials may be used when implementing the inventive method, or even at least a 50% or a 75% volume-fill of attenuating materials.

Example 4

Pall Rings are one common example of an attenuating material having components with at least one through passage.

It can be seen from Table 1 provided in connection with Example 1 hereinabove, that components with at least one through passage do not always behave as expected with respect to deflagration pressure attenuation. This departure from ideal attenuating material behavior may in some instances, as in the case of 2" Pall Rings in the 4 cubic meter test vessel (see Example 1 above), result in Pmax actually becoming greater than Pmax for the empty vessel.

To illustrate this departure from ideal attenuating material behavior, DMF values for the Pall Ring tests presented above in Table 1 were calculated and this DMF vs. Pmax data was then plotted as shown in FIG. 11. It was determined that the mathematical relationship between the data points in this example is: Pmax(n)=−4.2146×[DMF(n)]^2+27.905×DMF(n)−16.939 One of ordinary skill in mathematics will recognize this to be a polynomial relationship, rather than an idealized linear relationship, between Pmax and DMF (see polynomial curve shown in FIG. 11). For convenience, Pmax for the empty vessel is also indicated in FIG. 11 by a horizontal line at 21 bar (290 psig).

It can be seen from FIG. 11 that attenuation materials having components with at least one through passage do not always behave as expected with respect to deflagration pressure attenuation. It is further apparent that this non-ideal behavior was more pronounced as DMF increases. While not being bound to theory, it is hypothesized that, as the effective internal diameter of the through passage increases, pressure wave propagation through the component is favored, which means that axial propagation of the deflagration pressure wave is promoted at the expense of radial deflection, resulting in reduction of the degree of Pmax attenuation. As previously noted, in some instances, such as in the case of 2-inch Pall Rings (Table 1 hereinabove), the net result may be that Pmax actually becomes greater than Pmax for the Empty Vessel.

To provide a better understanding of non-ideal attenuation material behavior (i.e., with components having at least one through passage), additional determinations of Pmax were made using components with more than one through passage—specifically, ¾-inch PROWARE™ TY-PAK® heat transfer media and HexPak™ 90 heat transfer media (both commercially available from Saint-Gobain Norpro of Stow, Ohio, USA). The previously described test procedure and 10-liter test apparatus was again used for these experiments. All of these experiments were performed at initial pressure of 3.4 bar (35 psig) and an initial temperature of 225° C. In all experiments, a combustible gas composition of 5.5 vol % propylene, 19.5% oxygen, 73.3% nitrogen, and 1.7% water was used.

It can be seen from the data in both Table 1 (see Example 1, above) and Table 5 (below) that attenuating materials having components with at least one through passage may be used to successfully attenuate deflagration pressure in accordance with the method of the present invention.

TABLE 5

| Component | External Geometry | Number of Through-passages | Pmax (bar) | (psig) |
|---|---|---|---|---|
| A Empty Vessel | — | — | 19.2 | 263 |
| K Proware ™ Ty-pak ® | Bow-tie | 2 | 13.3 | 178 |
| L Proware ™ Ty-pak ® | Bow-tie | 2 | 12.1 | 161 |
| M Proware ™ Ty-pak ® | Bow-tie | 2 | 13.2 | 177 |
| N HexPak ™ 90 | Hexagon | 91 | 16.4 | 223 |
| O HexPak ™ 90 | Hexagon | 91 | 17.5 | 239 |

It is believed that for attenuating materials having components with at least one through passage, wherein the size of through passage(s) in each component is small, thereby providing minimal capability for axial flow, an ideal linear relationship between the values of DMF and Pmax exists. However, it will be apparent to one of ordinary skill, given the benefit of the present disclosure, that components with at least one through passage may deviate from ideal attenuating material behavior as component size (and therefore DMF value) and the size of through passage(s) increase. It is, therefore, recommended that a greater degree of laboratory testing be performed for evaluating attenuating materials having components with through passages in order to ascertain where the potential departure from ideal linear behavior occurs.

Example 5

The previously described 10 liter adiabatic explosion-test apparatus, was again utilized for the Pmax determinations in this example, wherein wire mesh cylinders were evaluated for use as attenuating material. In this example, a 0.673-liter cylindrical wire-screen cage was placed around the ignition source inside the test sphere.

A test gas composition of 5.5 vol % propylene, 19.5% oxygen, 73.3% nitrogen, and 1.7% water was prepared by mixing pure component gases in a heated premixing vessel. This test gas composition was used for all Pmax determinations in this example.

Tests H, I, J:

Crimped wire mesh cylinders were prepared from rectangular sheets of crimped, 18 lb/cuft, 304L stainless steel wire mesh. The sheets were rolled into cylinders measuring about 7.6 cm (3 inches) in diameter and about 15.2 cm (6 inches) in length. Some of these cylinders were used as-is, while some were cut to shorter length in order to better fit the curvature of the test vessel. Approximately 2.4 kg of crimped wire mesh cylinders were manually placed into the test vessel to provide a closely packed fill that minimized voids and channels. This represented a 93% volume-fill of mesh cylinders. As in the previous experiments, the vessel was next evacuated and then charged with test gas to achieve an internal gas pressure of 3.4 bar (35 psig) and an initial temperature of 225° C. The gas was then ignited to obtain a measurement of Pmax of the resulting deflagration pressure in the test vessel with crimped wire mesh cylinders. Experiments were repeated to assess the variability of this embodiment and results are shown in the following Table 6.

TABLE 6

| | Component | Pmax (bar) | Pmax (psig) |
|---|---|---|---|
| A | Empty Vessel | 19.2 | 263 |
| H | Crimped Wire Mesh Cylinder | 7.54 | 95 |
| I | Crimped Wire Mesh Cylinder | 7.36 | 92 |
| J | Crimped Wire Mesh Cylinder | 7.56 | 95 |

It should be noted that, because wire mesh can be compressed, it is possible to provide a close-fit that cannot be achieved with rigid components such as ceramic spheres or ceramic foam. The DMF value was developed to account for the easily reproducible effects of geometry, size, and packing fraction of rigid components, rather than compressible components. As a result, it does not appear that the DMF concept can be reliably applied to the scale-up to wire mesh components; if one chooses to use wire mesh cylinders, it is recommended that direct testing be performed as described herein to assure proper implementation of the inventive concept and further, that substantial care be taken to make the packing of such components as reproducible as possible.

Additionally, it should be noted that settling and compression of wire mesh components may affect the uniformity of component packing within the process vessel. It will be obvious to one of ordinary skill that settling and compression are more likely to occur in large, commercial scale vessels vs. laboratory-scale test vessels, due to the increased static loading created when the height of stacked wire mesh components becomes large. The concern in such a situation is that settling and compression could alter the uniformity of the wire mesh packing density, thereby reducing the effectiveness of wire mesh in attenuating deflagration pressure. Although wire mesh blankets can be used within a process vessel in accordance with the method of the present invention, such blankets—especially when used as the majority component within the process vessel—are susceptible to settling and compression. It is therefore preferred that wire mesh first be rolled into cylinders before placement within the process vessel in order to provide greater resistance to settling and compression. Thus, in one embodiment of the present invention, uncrimped wire mesh may be used to form wire mesh cylinders, or crimped wire mesh may be used, in order to minimize the total weight of the attenuating materials in the process vessel.

It will be understood that the embodiments of the present invention described hereinabove are merely exemplary and that a person skilled in the art may make variations and modifications without departing from the spirit and scope of the invention. All such variations and modifications are intended to be included within the scope of the present invention.

What is claimed is:

1. A method for attenuating deflagration pressure produced by combustion of combustible gas in a defined region of a process vessel, which has a maximum allowable containment pressure (P(c)), under known operating conditions comprising initial feed gas composition, temperature and pressure, wherein a peak pressure is reached in the defined region after ignition and wherein the defined region has a cross-sectional radius (R(v)), by selecting and placing attenuating material in the defined region of the process vessel, wherein the selected attenuating material maintains its physical shape under the operating conditions and has a plurality of components, all of which have a geometry and a effective diameter, said method comprising:

(A) determining the maximum effective diameter of components of the attenuating material which is suitable for use in the defined region of the process vessel by developing empirical data comprising associated pairs of peak deflagration pressures and deflagration mixing factors, which demonstrates a linear relationship between a plurality of attenuating materials, at least one of which has components with an effective diameter which differs from the effective diameters of the components of the other attenuating materials, and the peak pressures reached after ignition of combustible gas having the same composition as the initial feed gas composition by:

(1) empirically determining the peak deflagration pressure (Pmax(0)) resulting from ignition of the combustible gas in the absence of any attenuating material, using a test sphere having a radius (R(ts));

(2) empirically determining at least a first and a second peak deflagration pressure (Pmax(1), Pmax(2)) resulting from ignition of the combustible gas in the presence of at least a first selected attenuating material having a first effective diameter (Ds(1)) and a second selected attenuating material having a second effective diameter (Ds(2)) different from the first effective diameter, using the same test sphere used in step (1):

(3) calculating the deflagration mixing factors (DMF(0), DMF(1), DMF(2), . . . DMF(n)) for each associated peak deflagration pressure empirically determined in steps (1) and (2), by using the following mathematical relationship:

$$DMF(n) = (Ds(n)/Rts) \times 40$$

wherein n=0, 1, 2 . . . n, and Ds(n) and R(ts) are each measured in centimeters;

(4) linearizing the empirical data comprising associated pairs of peak deflagration pressures and deflagration mixing factors ([Pmax(0), DMF(0)]; [Pmax(1) DMF(1)], [Pmax(2), DMF(2)], . . . [Pmax(n), DMF(n)]) by determining the value of variables M and B based on the following mathematical relationship:

$$Pmax(n) = M \times DMF(n) + B$$

wherein n=0, 1, 2 . . . n;

(5) calculating the maximum deflagration mixing factor (DMF(a)) suitable for the process vessel using the maximum allowable containment pressure (P(c)) of the process vessel and the values of M and B calculated in step (4), based on the following mathematical relationship:

$$DMF(a) = [P(c) - B]/M;$$

(6) calculating the maximum effective diameter (Ds(a)) of attenuating material suitable for use with the process vessel having the cross-sectional radius (R(v)), using the following mathematical relationship:

$$Ds(a)=[DMF(a) \times R(v)]/40; \text{ and}$$

(B) selecting suitable attenuating material having an effective diameter less than or equal to the calculated maximum effective diameter (Ds(a)) and placing the selected attenuating material in the defined region of the process vessel, such that void spaces and open pathways between the components are minimized.

2. The method of claim 1, wherein the step (A)(1) of empirically determining the peak deflagration pressure (Pmax(0)) comprises:
(a) igniting the combustible gas in the test sphere, which is otherwise empty, under the pressure and temperature of the predetermined operating conditions; and
(b) measuring the highest pressure (Pmax(0)) reached in the test sphere, after ignition;
and wherein the step (A)(2) of empirically determining at least a first and a second peak deflagration pressure (Pmax(1), Pmax(2)) comprises:
(a) igniting combustible gas in the test sphere, after filling it with the first selected attenuating material, under the pressure and temperature of the predetermined operating conditions;
(b) measuring the highest pressure (Pmax(1)) reached in the test sphere filled with the first selected attenuating material, after ignition;
(c) igniting combustible gas in the test sphere, after filling it with the second selected attenuating material, under the pressure and temperature of the predetermined operating conditions; and
(d) measuring the highest pressure (Pmax(2)) reached in the test sphere filled with the second selected attenuating material, after ignition.

3. The method of claim 1, wherein step (A)(2) comprises empirically determining a plurality of peak deflagration pressures (Pmax(1), Pmax(2), Pmax(3), . . . Pmax(n)) and utilizing each of said plurality of peak deflagration pressures in the calculating and linearizing steps (3), (4), (5) and (6).

4. The method of claim 1, wherein the combustible gas comprises hydrocarbons and oxygen.

5. The method of claim 1, wherein the attenuating material comprises at least one type of material selected from the group consisting of: ceramic, mineral, metal and polymer and the geometry of the attenuating material comprises at least one shape selected from the group consisting of: spherical, oval, cylindrical, wire, saddle-shaped, block-shaped, elongated and polyhedral, and at least one characteristic selected from the group consisting of: solid, hollow, porous, and having at least one through passage.

6. The method of claim 1, wherein the process vessel is a shell and tube reactor operating under flowing conditions.

7. The method of claim 1, wherein when the attenuating material is not self-ordering when randomly provided to the defined region of the process vessel, placing step (B) comprises manually positioning each component of the attenuating material in the defined region wherein void spaces and open pathways between the components are minimized.

8. The method of claim 1, wherein the attenuating material occupies at least 20% by volume of the defined region.

9. A tubular reactor adapted for attenuation of deflagration pressure resulting from combustion of combustible gas therein, said tubular reactor comprising a plurality of tubes each extending between a first and a second perforated plate, all of which are enclosed in a shell which forms a shell-side region for circulation of fluid around the plurality of tubes, and a reaction-side region which comprises a defined inlet region, bounded on one side by the first perforated plate and having a radius equal to the radius of the first perforated plate, and a defined outlet region bounded on one side by the second perforated plate and having a radius equal to the radius of the second perforated plate, wherein each of the plurality of tubes is in fluid communication with both the defined inlet and defined outlet regions for throughput of reaction fluids, said tubular reactor further comprising attenuating material having a plurality of components, all of which have a geometry and which are placed such that void spaces and open pathways between the components are minimized, wherein the attenuating material occupies at least 20% of at least one of the defined inlet region and the defined outlet region; wherein the components of the attenuating material have an effective diameter (Ds(a)) which satisfies the following mathematical relationship:

$$Ds(a)=[DMF(a) \times R(v)]/40$$

wherein Ds(a) is in centimeters, (DMF(a)) is the deflagration mixing factor associated with the attenuating material and which is determined empirically by the method according to claim 1, and R(v) is the radius of whichever defined inlet or outlet region is occupied by the attenuating material.

10. The method of claim 9, wherein the combustible gas comprises hydrocarbons and oxygen and the reactor is operating under flowing conditions.

11. The method of claim 9, wherein the attenuating material comprises at least one type of material selected from the group consisting of: ceramic, mineral, metal, polymer and the geometry of the attenuating material comprises at least one shape selected from the group consisting of: spherical, oval, cylindrical, saddle-shaped, block-shaped, elongated and polyhedral, and at least one characteristic selected from the group consisting of: solid, hollow, porous, and having at least one through passage.

12. The method of claim 9, wherein two or more attenuating materials are placed in at least one of the defined inlet region and defined outlet region and at least one of the attenuating material has components with a geometry different from the geometry of the components of the other attenuating material.

13. The method of claim 9, wherein two or more attenuating materials are placed in at least one of the defined inlet region and defined outlet region and at least one of the attenuating material has components with an effective diameter (Ds(a)) which satisfies the following mathematical relationship:

$$Ds(a)=[DMF(a) \times R(v)]/40$$

wherein Ds(a) is in centimeters, (DMF(a)) is the deflagration mixing factor associated with the attenuating material and which is determined empirically by the method according to claim 1, and R(v) is the radius of whichever defined inlet or outlet region is occupied by the attenuating material.

14. A method for performing gas phase reactions safely under flammable operating conditions, which comprise a gas feed composition, temperature and pressure, said method comprising:
(A) providing a reaction vessel having a defined region through which said gas feed composition passes, said defined region being at least 20% by volume occupied by at least one attenuating material which maintains its physical shape under the flammable operating conditions and which is selected according to the method of claim 1;

(B) providing one or more gaseous materials comprising a hydrocarbon, an oxygen-containing gas and, optionally, an inert material, to said reaction vessel to form said gaseous feed composition which passes through said defined region;

(C) subjecting said gaseous feed composition to one or more reactions in the reaction vessel, at a temperature and pressure under which said gaseous feed composition is flammable.

15. The method of claim 14, wherein the attenuating material comprises at least one type of material selected from the group consisting of: ceramic, mineral, metal and polymer and each of the plurality of components of the attenuating material has a geometry comprising at least one shape selected from the group consisting of: spherical, oval, cylindrical, wire, saddle-shaped, block-shaped, elongated and polyhedral, and at least one characteristic selected from the group consisting of: solid, hollow, porous, and having at least one through passage.

16. The method of claim 15, wherein said hydrocarbon comprises propylene, said gas phase reactions comprise oxidation of the propylene, and said attenuating materials comprise crimped wire mesh cylinders and crimped wire mesh polyhedrons.

17. The method of claim 15, wherein said one or more gaseous materials further comprise ammonia, said hydrocarbon comprises methane, said gas phase reactions comprise ammoxidation of the methane, and said attenuating materials comprise ceramic foam polyhedrons.

* * * * *